United States Patent
Caterina et al.

(10) Patent No.: US 12,090,371 B1
(45) Date of Patent: Sep. 17, 2024

(54) RADIO-OPAQUE FILLERS IN MULTIPLE LAYERS OF GOLF BALLS

(71) Applicant: Callaway Golf Company, Carlsbad, CA (US)

(72) Inventors: Julie Caterina, Carlsbad, CA (US); Nick Lannes, Carlsbad, CA (US); Grady C. Crahan, Carlsbad, CA (US)

(73) Assignee: Topgolf Callaway Brands Corp., Carlsbad, CA (US)

( * ) Notice: Subject to any disclaimer, the term of this patent is extended or adjusted under 35 U.S.C. 154(b) by 513 days.

(21) Appl. No.: 17/532,747

(22) Filed: Nov. 22, 2021

Related U.S. Application Data

(63) Continuation-in-part of application No. 17/347,185, filed on Jun. 14, 2021, now Pat. No. 11,590,394, which is a continuation of application No. 17/178,159, filed on Feb. 17, 2021, now Pat. No. 11,058,924.

(60) Provisional application No. 63/142,797, filed on Jan. 28, 2021, provisional application No. 62/978,686, filed on Feb. 19, 2020, provisional application No. 63/084,388, filed on Sep. 28, 2020.

(51) Int. Cl.
| | |
|---|---|
| A63B 47/00 | (2006.01) |
| A63B 37/00 | (2006.01) |
| A63B 43/00 | (2006.01) |
| G01N 23/04 | (2018.01) |
| G01N 23/083 | (2018.01) |
| G01N 23/18 | (2018.01) |
| A63B 102/32 | (2015.01) |

(52) U.S. Cl.
CPC ........ *A63B 47/008* (2013.01); *A63B 37/0031* (2013.01); *A63B 37/0033* (2013.01); *A63B 37/0043* (2013.01); *A63B 37/0045* (2013.01); *A63B 43/00* (2013.01); *G01N 23/04* (2013.01); *G01N 23/083* (2013.01); *G01N 23/18* (2013.01); *A63B 37/0076* (2013.01); *A63B 2102/32* (2015.10); *A63B 2225/055* (2013.01); *G01N 2223/401* (2013.01); *G01N 2223/646* (2013.01)

(58) Field of Classification Search
CPC .............. A63B 47/008; A63B 37/0031; A63B 37/0033; A63B 37/0043; A63B 37/0045; A63B 43/00; A63B 37/0076; A63B 2102/32; A63B 2225/055; G01N 23/04; G01N 23/083; G01N 23/18; G01N 2223/401; G01N 2223/646
See application file for complete search history.

(56) References Cited

U.S. PATENT DOCUMENTS

| | | | |
|---|---|---|---|
| 4,144,223 A | 3/1979 | Kent | |
| 6,160,870 A | 12/2000 | Jacobson | |
| 6,390,937 B1* | 5/2002 | Marshall | A63B 37/0003 473/371 |
| 6,757,353 B2 | 6/2004 | Furze | |
| 6,767,940 B2 | 7/2004 | Voorheis et al. | |
| 6,809,822 B2 | 10/2004 | Welchman et al. | |
| 6,928,140 B2 | 8/2005 | Furze | |

(Continued)

*Primary Examiner* — Courtney D Thomas
(74) *Attorney, Agent, or Firm* — Michael A. Catania

(57) ABSTRACT

A golf ball with at least one layer having radio-opaque fillers is disclosed herein. The at least one layer comprises from 1.0% to 25% by weight of a radio-opaque filler. The at least one layer has a pixel value gradient of 0.75 or less from an inner edge to an outer edge of the at least one layer when examined with a radiographic imaging system.

18 Claims, 27 Drawing Sheets

(56) References Cited

U.S. PATENT DOCUMENTS

| | | | |
|---|---|---|---|
| 7,175,545 | B2 | 2/2007 | Kuntimaddi et al. |
| 7,223,981 | B1 | 5/2007 | Capote et al. |
| 7,943,689 | B2 | 5/2011 | Shiga et al. |
| 8,008,641 | B2 | 8/2011 | Harris et al. |
| 8,073,234 | B2 | 12/2011 | Harris et al. |
| 8,168,712 | B2 | 5/2012 | Tarao |
| 8,188,177 | B2 | 5/2012 | Tarao |
| 8,394,881 | B2 | 3/2013 | Yamada et al. |
| 8,463,574 | B2 | 6/2013 | Schaafsma et al. |

\* cited by examiner

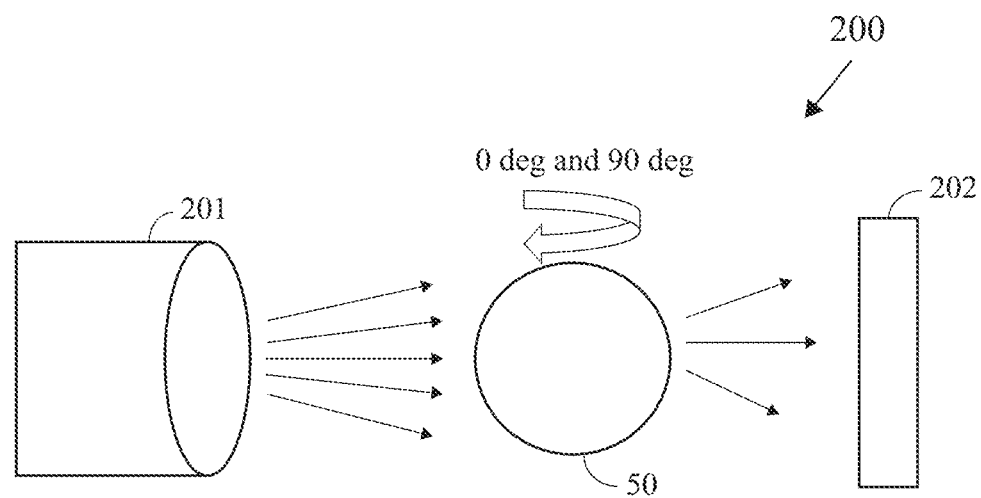
FIG. 2
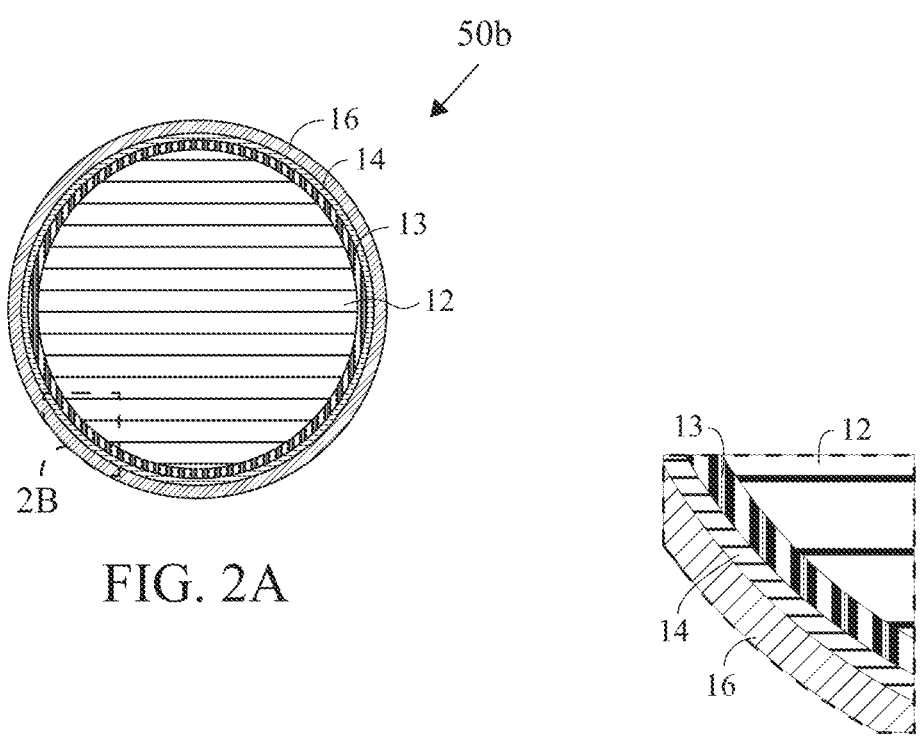
FIG. 2A
FIG. 2B

INNER EDGE

Control - 0%

3.5% Loading

7% Loading 10.5% Loading

14% Loading 18.7% Loading

| | Z-eff |
|---|---|
| BaSO4 | 47.11376 |
| TiO2 | 19.89518 |
| ZnO | 27.73375 |
| HNCO2 | 6.411993 |
| H2O | 7.425969 |

RADIO-OPAQUE FILLERS IN MULTIPLE LAYERS OF GOLF BALLS

CROSS REFERENCES TO RELATED APPLICATIONS

The present application claims priority to U.S. Provisional Patent Application No. 63/142,797, filed on Jan. 28, 2021, and is a continuation-in-part application of U.S. patent application Ser. No. 17/347,185, filed on Jun. 14, 2021, which is a continuation application of U.S. patent application Ser. No. 17/178,159, filed on Feb. 17, 2021, now U.S. patent Ser. No. 11/058,924, issued on Jul. 13, 2021, which claims priority to U.S. Provisional Patent Application No. 62/978,686, filed on Feb. 19, 2020, and U.S. Provisional Patent Application No. 63/084,388, filed on Sep. 28, 2020, each of which is hereby incorporated by reference in its entirety.

STATEMENT REGARDING FEDERALLY SPONSORED RESEARCH OR DEVELOPMENT

Not Applicable

BACKGROUND OF THE INVENTION

Field of the Invention

The present invention relates to a method and system for image scanning a golf ball.

Description of the Related Art

X-ray scanning has been used in the past for golf balls.

BRIEF SUMMARY OF THE INVENTION

The present invention is the doping of multiple golf ball layers with the same or different concentrations of the same or different radio-opaque fillers to provide differential contrast in an X-ray process.

Having briefly described the present invention, the above and further objects, features and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWINGS

FIG. 2 is an illustration of an X-ray scanning apparatus.
FIG. 2A is an X-ray of a golf ball.
FIG. 2B is an isolated view of a portion of an X-ray of a golf ball.

DETAILED DESCRIPTION OF THE INVENTION

Figure 11:
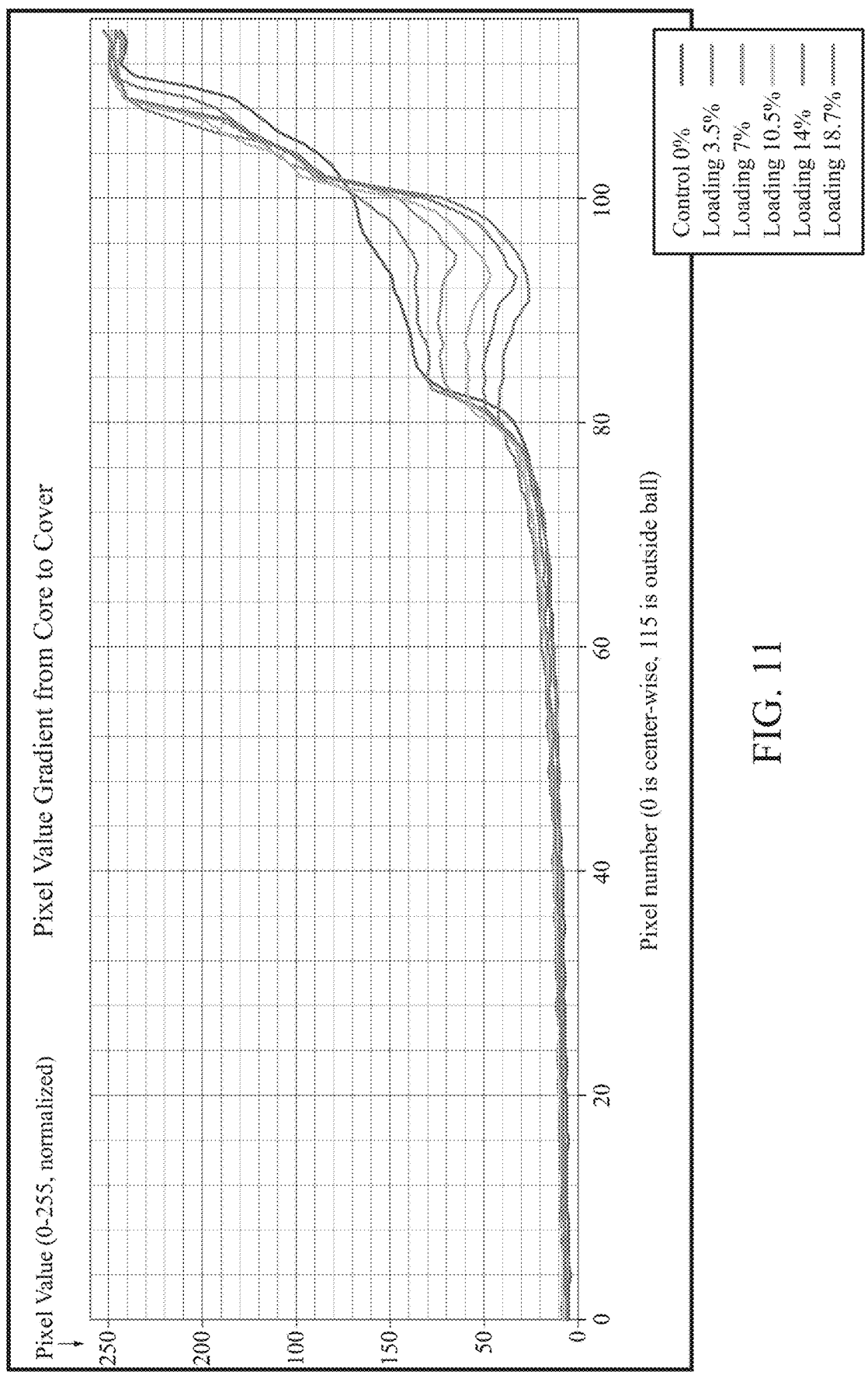
FIG. 11 is a graph of pixel value gradients from a core to a cover.
Figure 13:
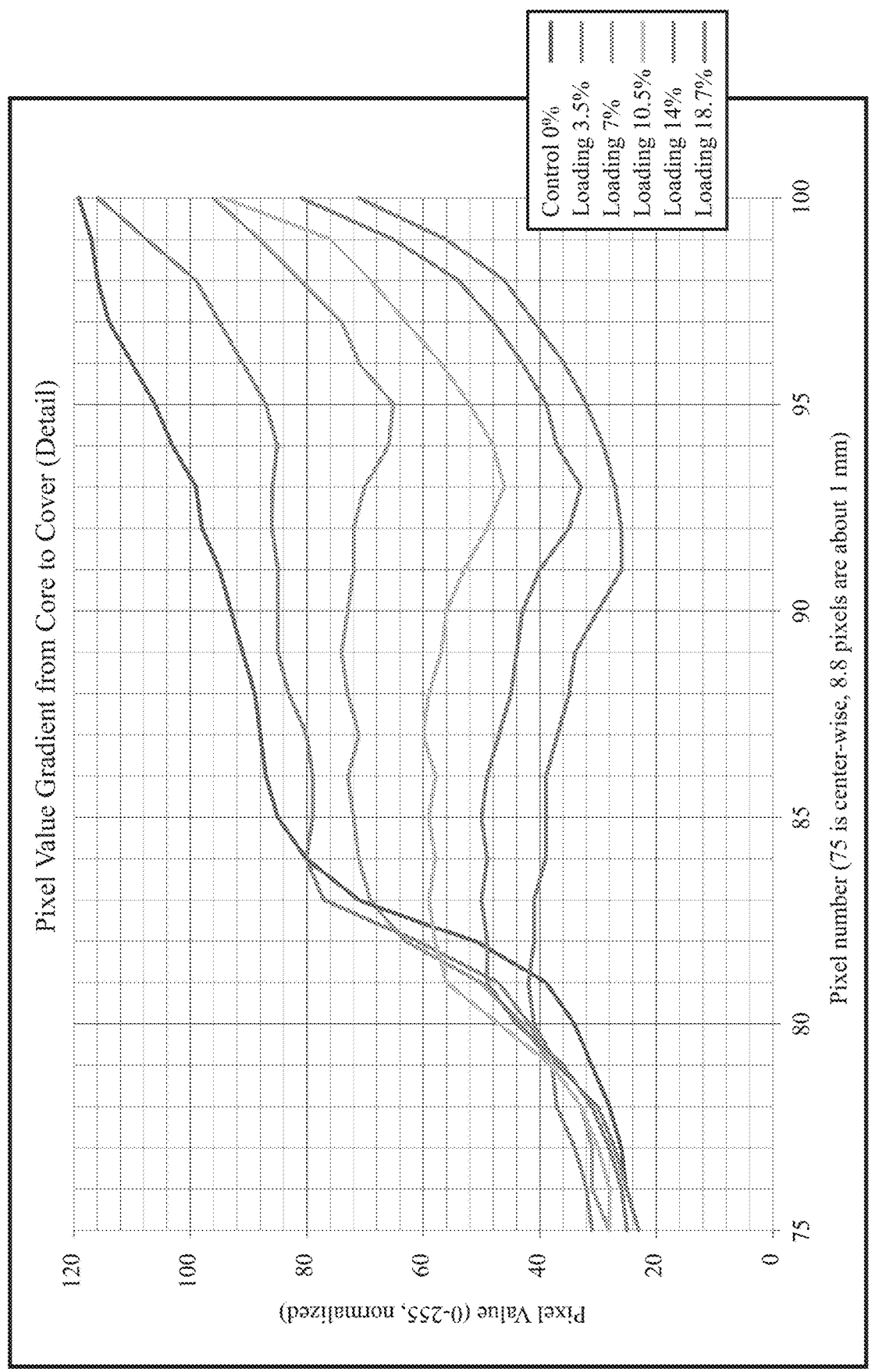
FIG. 13 is a graph of pixel value gradients from a core to a cover.

The luminance gradient in a golf ball from a center to an outer surface at a given photon surface energy is affected by three factors: the thickness change due to geometry of the ball; the density gradient of the ball materials from center to outer surface; the effective atomic number gradient of the ball material from center to outer surface. The density and effective atomic number's effects are combined into the linear attenuation coefficient. FIG. 11 is a graph of pixel value gradients from a core to a cover. FIG. 13 is a graph of pixel value gradients from a core to a cover.

Figure 12A:
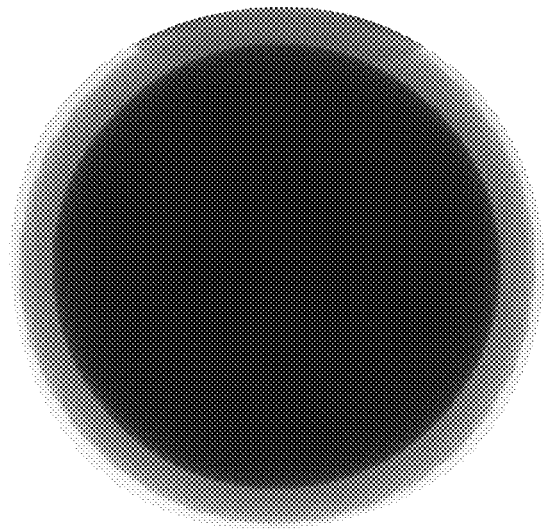
FIG. 12A is an illustration of a radio-opaque filler loading of golf balls.
Figure 12B:
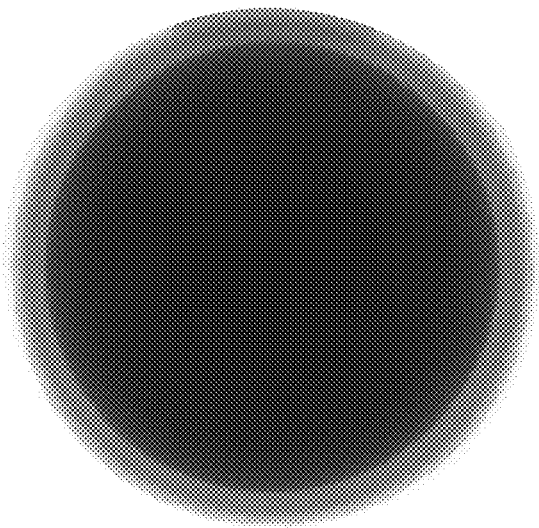
FIG. 12B is an illustration of a radio-opaque filler loading of golf balls.
Figure 12C:
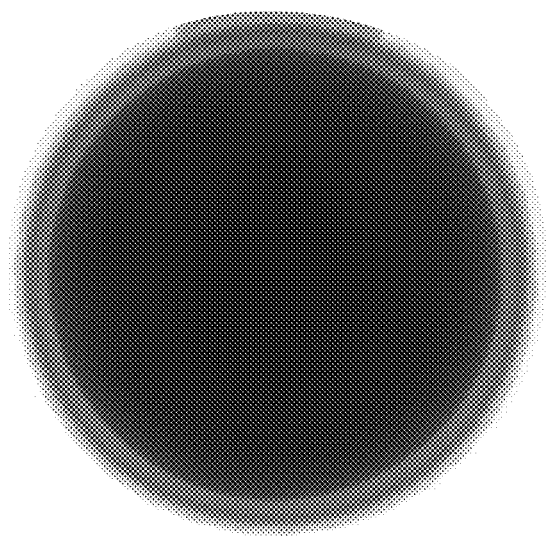
FIG. 12C is an illustration of a radio-opaque filler loading of golf balls.
Figure 12D:
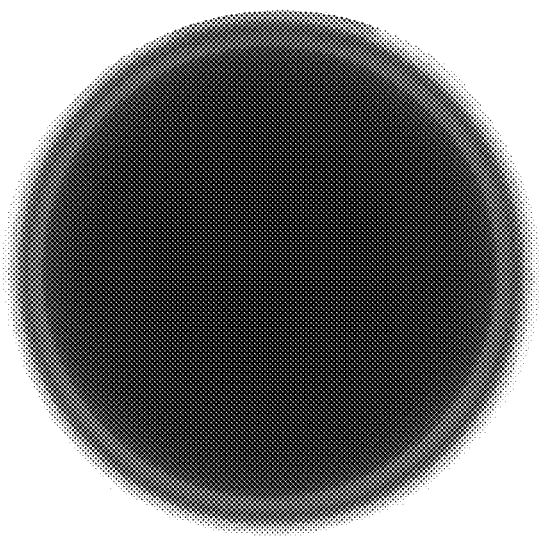
FIG. 12D is an illustration of a radio-opaque filler loading of golf balls.
Figure 12E:
FIG. 12E is an illustration of a radio-opaque filler loading of golf balls.
Figure 12F:
FIG. 12F is an illustration of a radio-opaque filler loading of golf balls.

FIGS. 12 and 12A are illustrations of a radio-opaque filler loading of golf balls.

Figure 14:
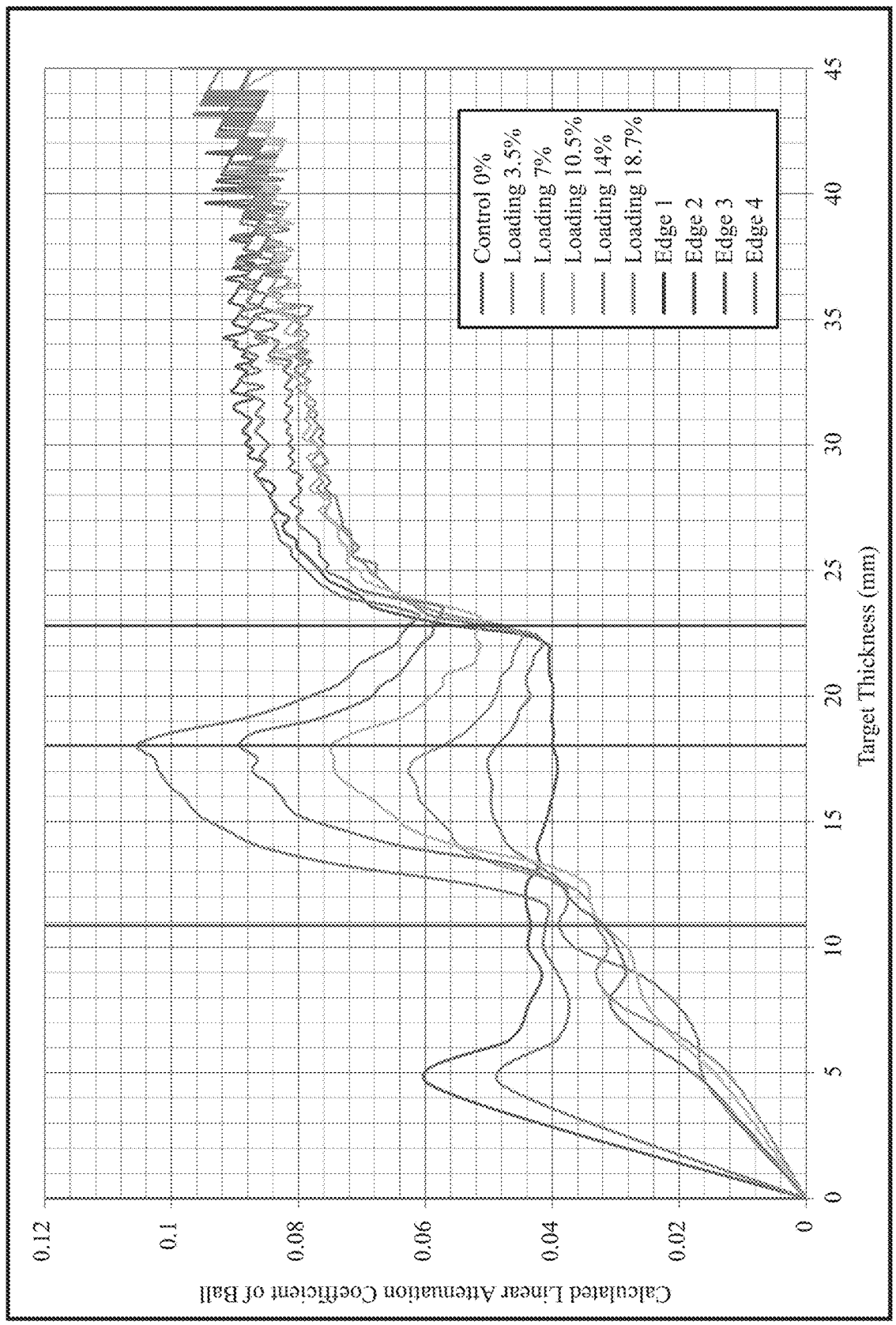
FIG. 14 is a graph of a calculated linear attenuation coefficient of a golf ball.

FIG. 14 is a graph of a calculated linear attenuation coefficient of a golf ball. Distinct behavior of the linear attenuation coefficient by layer. In the inner mantle region, there is a distinct increase in the linear attenuation coefficient in doped samples. In the outer mantle region, the linear attenuation coefficient drops back to values consistent with the control sample. There is no "notable" change in control sample's linear attenuation coefficient.

Figure 19:
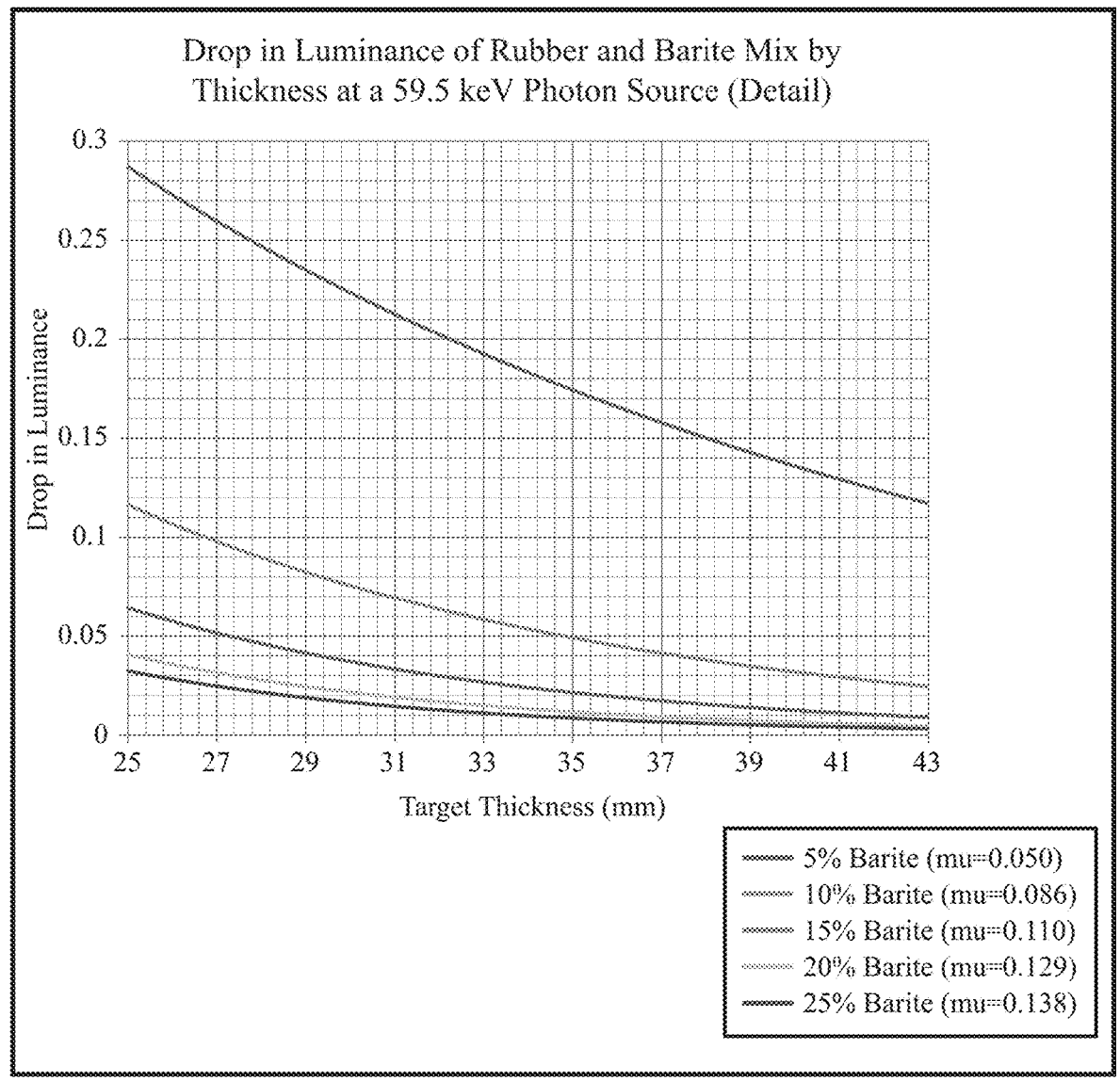
FIG. 19 is a graph of a reduction in luminance of a rubber and barite mix.
Figure 19A:
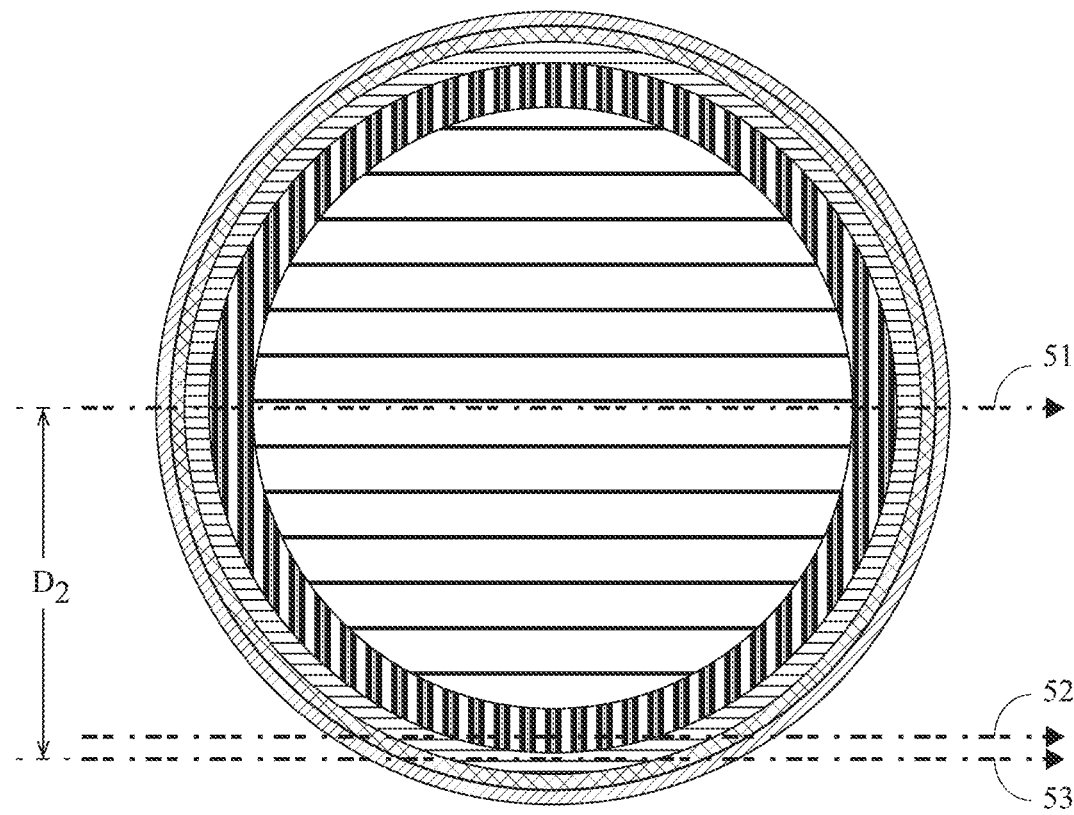
FIG. 19A is an illustration of a photon path through a golf ball.
Figure 20:
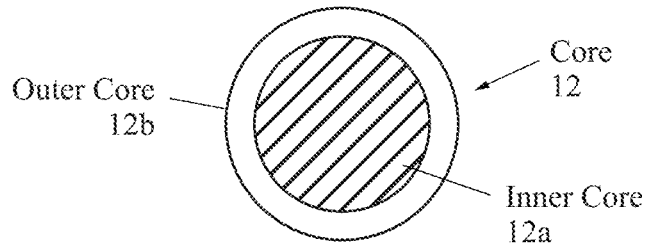
FIG. 20 is a cross-sectional view of a golf ball.
Figure 21:
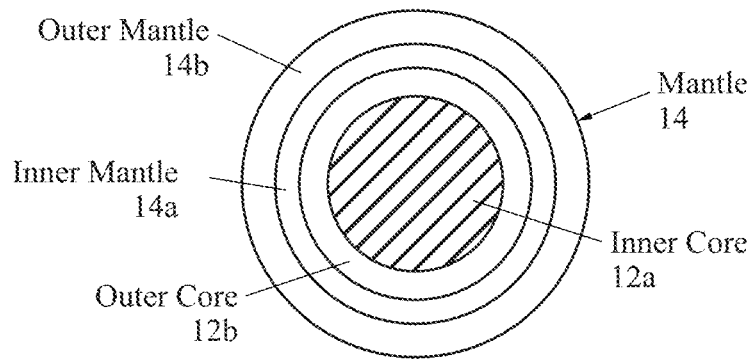
FIG. 21 is a cross-sectional view of a golf ball.
Figure 22:
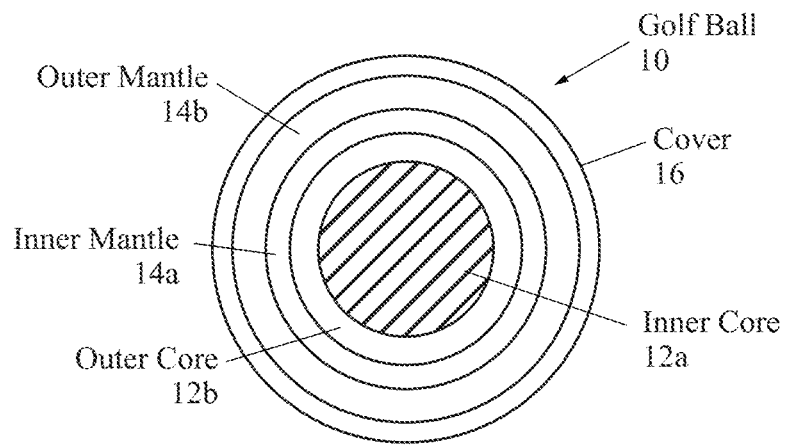
FIG. 22 is a cross-sectional view of a golf ball.
Figure 23:
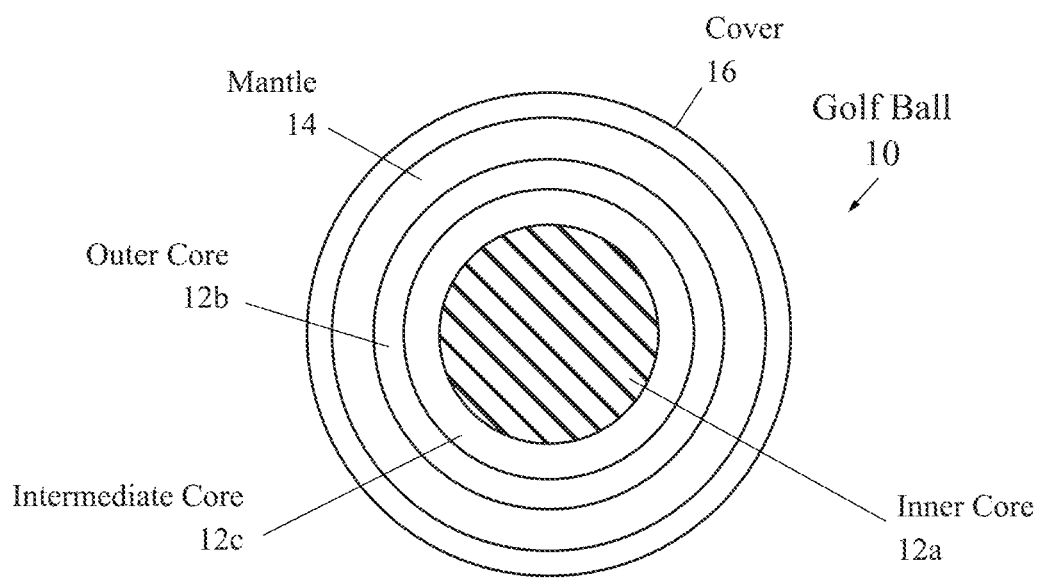
FIG. 23 is a cross-sectional view of a golf ball.
Figure 24:
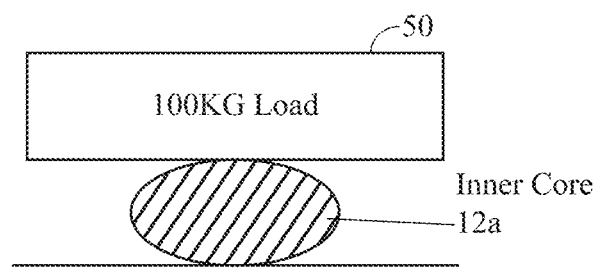
FIG. 24 illustrates a 100 kilogram loading of a core.
Figure 25:
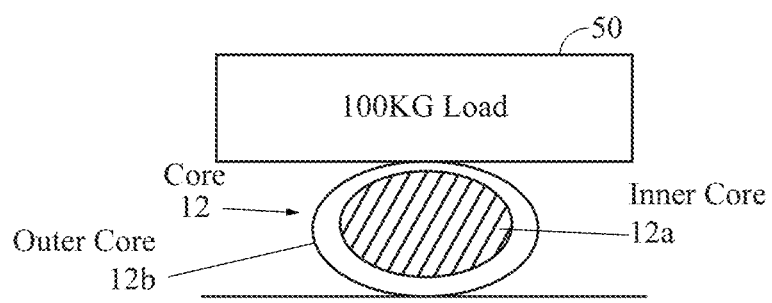
FIG. 25 illustrates a 100 kilogram loading of a dual core.
Figure 26:
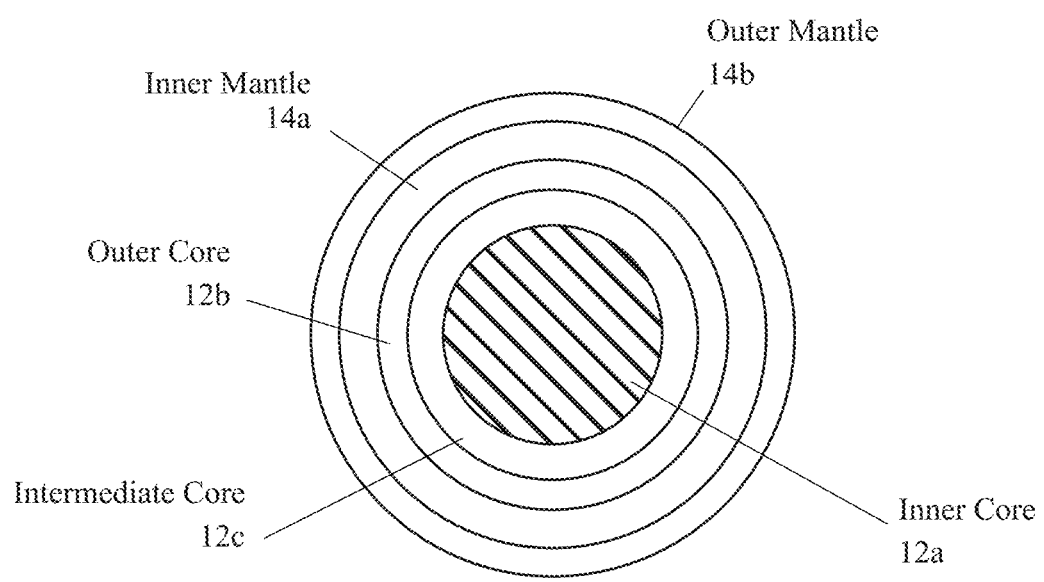
FIG. 26 is a cross-sectional view of a golf ball.
Figure 27:
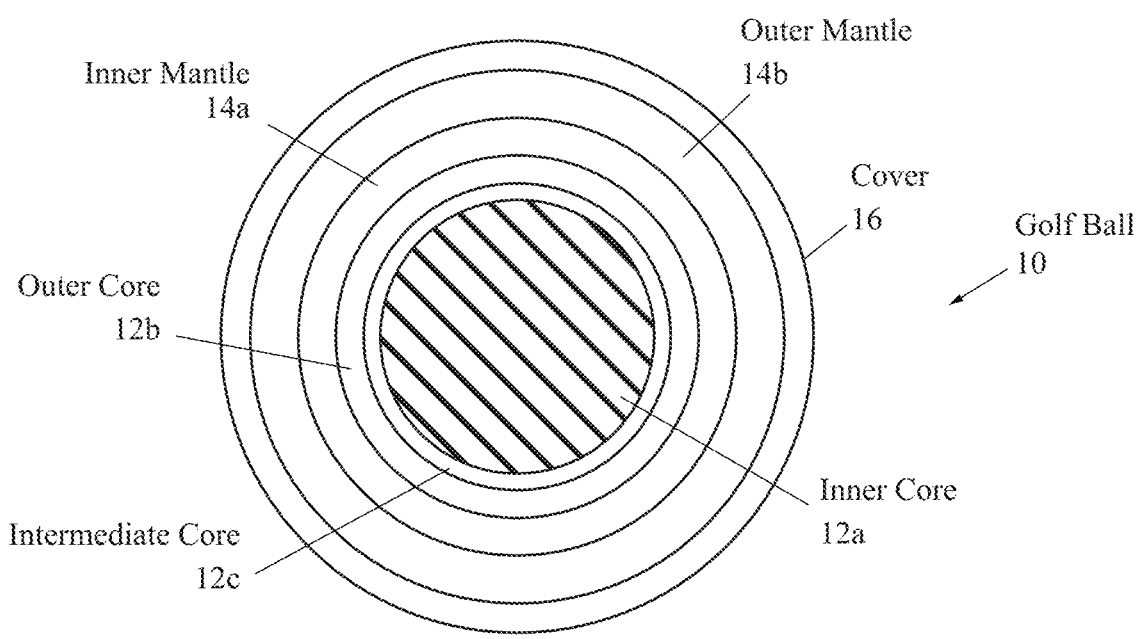
FIG. 27 is a cross-sectional view of a golf ball.

FIG. 19A is an illustration of a photon path through a golf ball. Table One illustrates a distance in millimeters traveled through each golf ball layer. Table Two illustrates a percent contribution to attenuation as a photon is shot through a golf ball.

TABLE ONE

|  | Distance | Core | Inner mantle | Outer Mantle | Cover |
|---|---|---|---|---|---|
| Photon A | 0 | 33.6 | 4.4 | 4.4 | 2.4 |
| Photon B | 16 | 10.2 | 10.2 | 7.3 | 3.5 |
| Photon C | 18 | 0.0 | 12.2 | 10.2 | 4.3 |

TABLE TWO

|  | Distance | Core | Inner mantle | Outer Mantle | Cover |
|---|---|---|---|---|---|
| Photon A | 0 | 75.0% | 9.8% | 9.8% | 5.4% |
| Photon B | 16 | 32.7% | 32.7% | 23.4% | 11.3% |
| Photon C | 18 | 0.0% | 45.6% | 38.4% | 16.0% |

The weighed contribution of each layer depending on photon path distance from center is what causes the peaks and valleys in the pixel value graphs.

Figure 15:
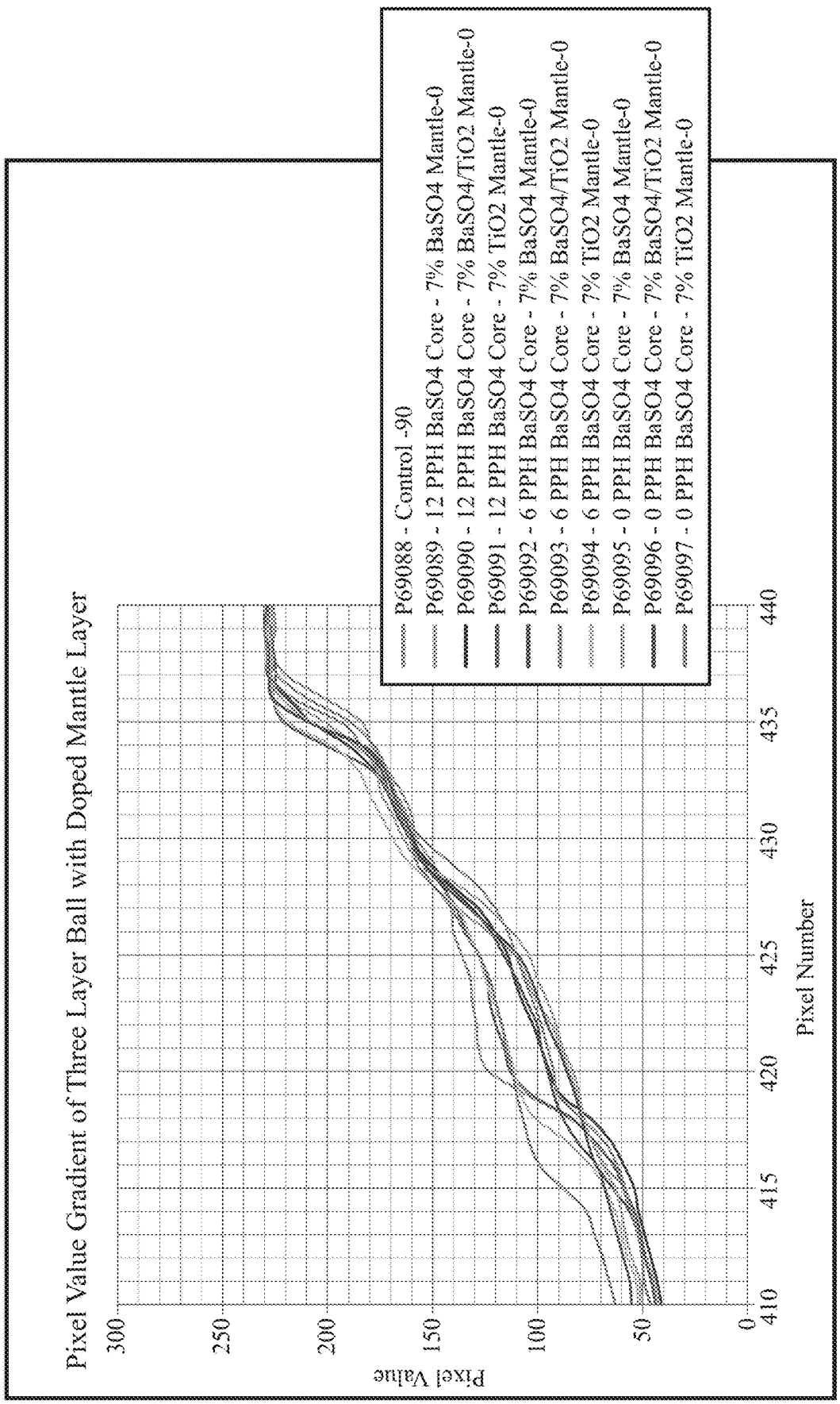
FIG. 15 is a graph of a pixel value gradient for a three-layer golf ball with a doped mantle layer.

FIG. 15 is a graph of a pixel value gradient for a three-layer golf ball with a doped mantle layer.

Figures 16, 17:
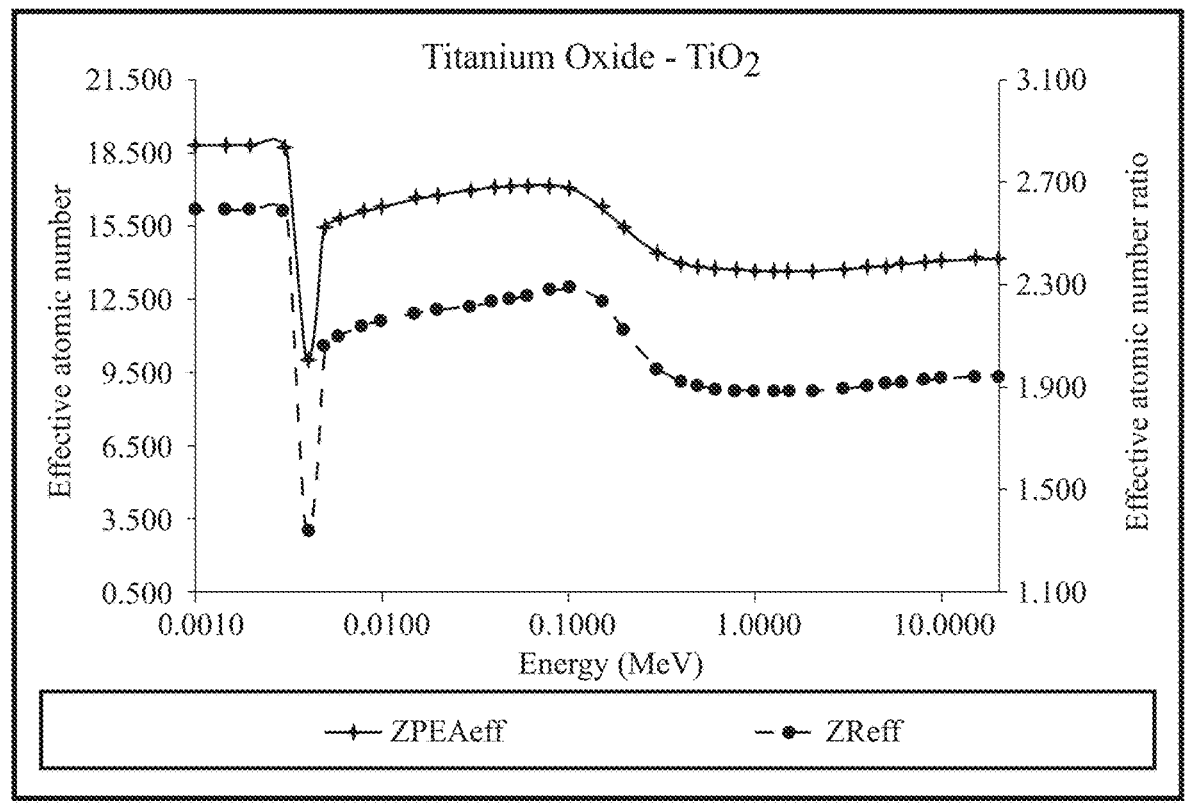
FIG. 16 is a graph of an effective atomic number.
FIG. 17 is a table of effective atomic numbers.

FIG. 16 is a graph of an effective atomic number. FIG. 17 is a table of effective atomic numbers. Effective Atomic Number depends on photon energy source. (Graph is for ZPEA-eff, which is only a component of Z-eff, but shows how much the effective atomic number can vary depending on source energy. A target thickness is x=2*sqrt(Ball Radius^2-Beam Distance from Center^2). The density of materials used in the ball is generally in the range of 0.75 to 1.5 g/cm^3; specifying how this density range affects variation in luminance from radiographic imaging could be useful. Some cores are densified with fillers to affect ball performance. Effective atomic number of materials/mixtures generally changes little within the polymer classes; it is also depended on photon source energy; may also be useful to specify. When adding fillers, the effective atomic number jumps significantly, in some cases irrespective of density. Density and effective atomic number are usually captured through the linear attenuation coefficient which affects luminance (correspondent to intensity).

An attenuation formula (x is thickness, mu is linear attenuation coefficient):

$$I_x = I_0 e^{-\mu x}$$

Figure 18:
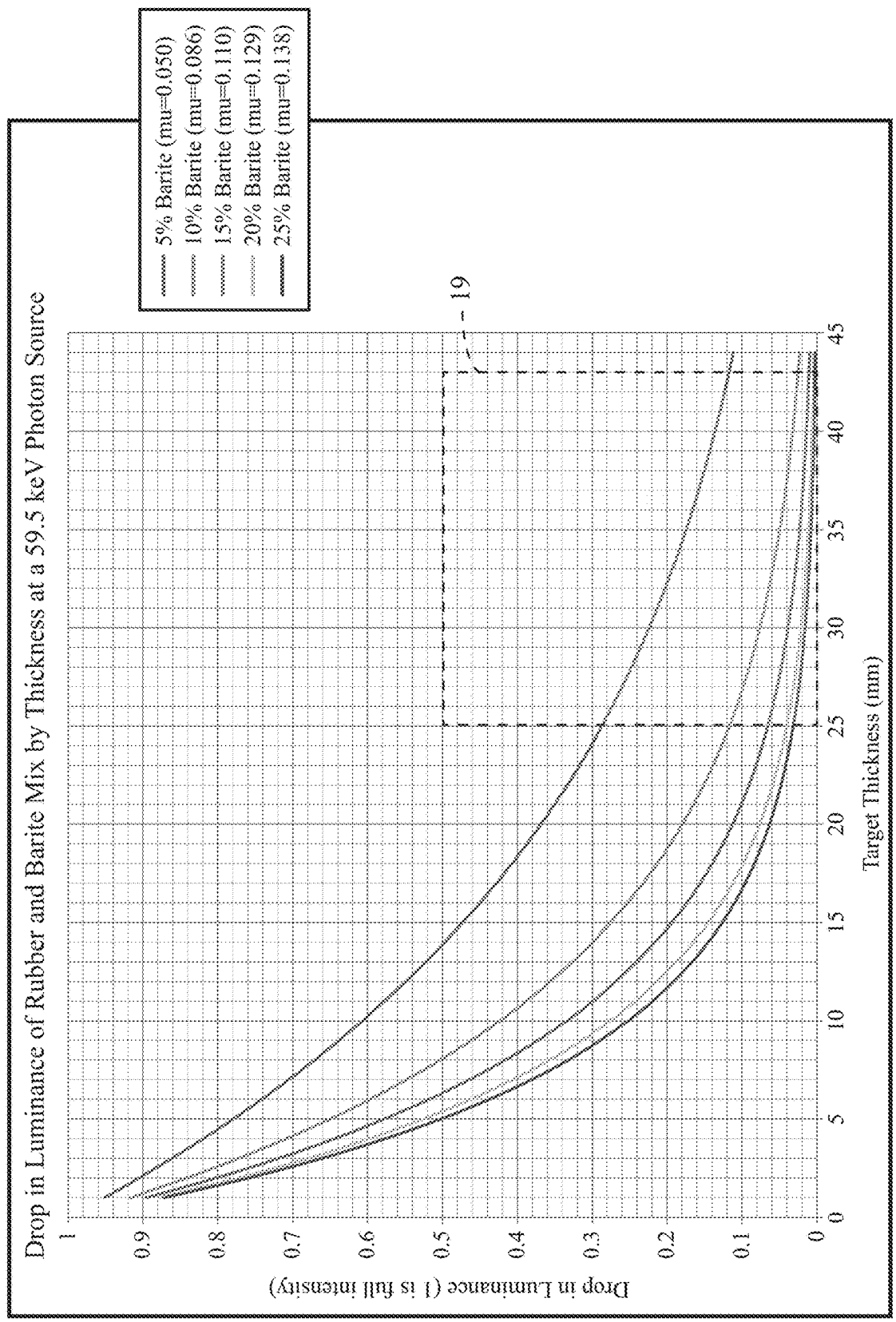
FIG. 18 is a graph of a reduction in luminance of a rubber and barite mix.

FIG. 18 is a graph of a reduction in luminance of a rubber and barite mix. FIG. 19 is a graph of a reduction in luminance of a rubber and barite mix. These graphs do not take into account that the target thickness includes contribution from the mantle and cover layer.

Determination of layer thickness or eccentricity in golf balls via X-ray has been disclosed in prior art. This involves doping a layer with a radio-opaque filler to provide contrast with other layers. However, the prior art refers to only doping a single layer to make measurements. Furthermore, it refers to very specific loadings, materials, and X-ray processes. This art is limiting in that it does not allow for imaging of multiple layers on the ball through any number of X-ray analysis techniques. This invention allows for the use of various loadings or filler types in multiple layers on the ball to enable X-ray analysis of those layers, perhaps in a single pass. Furthermore, existing prior art may be specific to constructions and materials. This invention may be applied more broadly.

The purpose of this invention is to load multiple layers of the golf ball with different concentrations or types of radio-opaque materials, enabling layer thickness and concentricity/eccentricity measurements of multiple layers in a single pass through an X-ray machine. This could be done with any number of X-ray analysis techniques which would provide contrast differences between layers. Hypothetically, it would be possible to measure diameters, thicknesses, and eccentricities of all the layers/components in the ball.

This invention describes the loading of multiple layers of a golf ball with various concentrations or types of radio-opaque fillers. Fillers would include, but not be limited to, compounds based on barium, bismuth, tungsten, iodine, or reduced iron. Layers which may comprise these fillers would do so at 0.05% to 70% by weight. Ideally, each layer would be doped with different concentrations of the same or different radio-opaque fillers. The X-Ray process would then be able to discern the various layers at either constant or variable X-ray power/intensity.

New features include the doping of multiple golf ball layers with same/different concentrations of same/different radio-opaque fillers to provide differential contrast in and X-ray process.

A method and system are illustrated in FIGS. 1-10.

Single source X-ray with an Image Intensifier and Camera. The image intensifier converts X-ray photons into highly visible light at sufficient intensity to provide a viewable image.

The digital detector uses X-ray sensitive plates to directly capture photons and convert into an image. Digital detectors generally have better resolution and less distortion error (parallax) but often cost more than their analog equivalent. By using the digital detector we were able to obtain a full ball image showing all layers with high resolution and good contrast. This increased magnification enables us to look at the full ball instead of a local region with a decreased field of view that is required with the analog system.

A steady feed of samples can be loaded into the measurement area using an angled rail system. The loading area is directly below the measurement region. The sample is picked up with a robot having a suction cup and is moved directly upwards (vertically) into the X-Ray measurement region in front of the X-Ray source. The sample is held in the measurement location either by the suction cup or placed onto a static fixture for the measurement to be taken. After the measurement the sample will be moved into the appropriate sorting chute and released.

Image intensifier and camera take multiple images (1-24 for analog, 1-8 for digital). Preferably, multiple images are taken and averaged to a single image. An edge detection method is used to determine diameter, or ellipse dimensions, of the inner and outer edges of desired layers. Y,Z coordinates of the best fit diameter or ellipse of the inner and outer edges are calculated.

The sample is then rotated 90 degrees by any of the methods below: having a ball held by a suction cup attached to a robot that rotates 90 degrees; placing a ball on a static fixture for image 1, then picking it up and rotating it and placing it back down for image 2; placing a ball on a static fixture for image 1, static fixture rotates 90 degrees and then image 2 is taken.

Multiple images (1-24 for analog, 1-8 for digital) are taken in the new orientation. An edge detection method is used to determine diameter, or ellipse dimensions, of the inner and outer edges. X,Z coordinates of the best fit diameter or ellipse of the inner and outer edges are calculated. Y,Z and X,Z images are combined to calculate 3D distance of the elliptical centerpoints. The concentricity of the inner and outer edges are calculated using Euclidean distances (3D distance between the center of inner sphere or ellipsoid and outer sphere or ellipsoid). Samples are evaluated against input criteria and sorted based on the criteria, objects will be moved into the appropriate sorting chute and released. The next sample is picked up and presented in front of the X-ray source to repeat the process. Multiple layers can be analyzed with a single set of images (1-24 for analog, 1-8 for digital) as long as the adjacent layers have a visual contrast in the image. This can be achieved by creating different layer densities and/or using different filler materials to create the different X-ray imaging contrast.

This embodiment involves 2 pairs of fixed X-ray sources and detectors (analog or digital) that can measure perpendicular planes without rotating the ball. This eliminates distortion caused when the sample rotates. The runout (wobble) of the object can create magnification and parallax issues that impact the precision of the measurement.

Similar to above, the new sample is presented in front of two X-ray sources by using either method below: having a sample held by a suction cup attached to a robot; Using a robot to place the sample on a static fixture.

The detectors (analog or digital) independently take multiple images. Multiple images (1-24 for analog, 1-8 for digital) are taken by each detector. An edge detection method is used to determine the diameter or ellipse of the inner and outer edges. X,Z coordinates of the best fit diameter or ellipse of the inner and outer edges are calculated for source 1. Y,Z coordinates of the best fit diameter or ellipse of the inner and outer edges are calculated for source 2. Y,Z and X,Z images are combined to calculate 3D distance. The concentricity of the inner and outer edges are calculated using Euclidean distances (3D distance between the center of inner sphere or ellipsoid and outer sphere or ellipsoid).

Samples are evaluated against input criteria and sorted. Based on the criteria, the sample will be moved into the appropriate sorting chute and released. The next sample is picked up and presented in front of the X-ray sources to repeat the process. Multiple layers can be analyzed with a single set of images (1-24 for analog, 1-8 for digital) as long as the adjacent layers have a visual contrast in the image. This can be achieved by creating different layer densities and/or using different filler materials to create the different X-ray imaging contrast.

Collect xray images on two or more axis on various layers of a golf ball at various stages of construction—core (dual or single), mantle(s) on a core, or covered mantle or covered core—to determine layer diameters, layer concentricities in 3D and identify inclusions.

Current machines in use at CGBO sort samples based on diameters and concentricity only. Development of inclusion identification and sorting has not been addressed but is functionality we have paid for. Will use artificial intelligence (AI) to detect inclusions. Callaway will supply an image database to Creative Electron to train AI model.

Main Screen. Information about: Machine status; Start/Stop machine; Xray power settings; Samples type being measured; Metrics/Results; Xray image of current sample.

While sample measurements are in progress, the operator may view the screen or the Home screen shown on the previous slide.

The operator enters additional inputs to the process. Save Images—this is asking if the xray images generated during measurement should be saved out to the network. If so, I believe they are jpg files. Conveyor Sensor—Enable when using hopper/conveyor feed of samples to machine.

Calibration—Up to three calibration standards are present inside the main measurement area of the xray cabinet. These are basically 'golden parts', i.e. dual core, dual core with a single mantle, single core with a dual mantle. Standards have a concentricity tolerance of ±0.0005 inch.

Defect Inspection: Inner Core—enable if you want machine to measured and sort by inner core diameter. Disable. Marginal Concentricity—enable if you want the machine to sort using two levels of concentricity. For example, top level product for tour players has a tighter tolerance than regular production tolerances. If enabled, machine will sort samples into two separate fiber drums 'tour certified' and 'production' based on thresholds listed in the Thresholds section.

Images to Average (Even): this is the number of images taken by the sensor and averaged down to one image at both 0° and 90°. Settings—Set speed of SCARA robot.

Thresholds: Recipe called CS20TC_Core is currently selected; Outer Diameter—Nominal target along with USL and LSL in inches; Inner Diameter—Nominal target along with USL and LSL in inches; Concentricity Fail Threshold; Concentricity Marginal Threshold; Ball Calibration Number—use calibration standard number 2 for calibrating. This is the standard that matches the samples currently running through the machine; Frequency of Calibration—machine will automatically pause measurement and recalibrate every 5000 samples. Calibration sets the number of pixels per inch. Core_Type—Select Single core or Dual core.

The operator has clicked the Select button from the Thresholds section. Double click on the recipe for the product to measure.

The operator has selected the Modify button from the Thresholds section. The menu is only accessible to an operator with elevated privileges. Enables override of settings for the current recipe. HMI to create new recipes. Congex machine vision software—This is an initial look for you of the Congex machine vision tools in use.

On the screen an Engineer can create a new recipe. Dual Core Exposure—camera brightness setting. Mantle Exposure—camera brightness setting. Need to confirm resolution of camera in machine—5MP or 2MP.

Golf balls having layers doped with radio-opaque fillers are shown in FIGS. 20-27.

Marshall et al., U.S. Pat. No. 6,390,937 for a Method For Verifying The Concentricity Of A Multiple Layer Golf Ball is hereby incorporated by reference in its entirety.

Collect xray images on two or more axis on various layers of a golf ball at various stages of construction—core (dual or single), mantle(s) on a core, or covered mantle or covered core—to determine layer diameters, layer concentricities in 3D and identify inclusions.

Current machines in use at CGBO sort samples based on diameters and concentricity only. Development of inclusion identification and sorting has not been addressed but is functionality we have paid for. Will use artificial intelligence (AI) to detect inclusions. Callaway will supply an image database to Creative Electron to train AI model.

Main Screen. Information about: Machine status; Start/Stop machine; Xray power settings; Samples type being measured; Metrics/Results; Xray image of current sample.

While sample measurements are in progress, the operator may view the screen or the Home screen shown on the previous slide.

The operator enters additional inputs to the process. Save Images—this is asking if the xray images generated during measurement should be saved out to the network. If so, I believe they are jpg files. Conveyor Sensor—Enable when using hopper/conveyor feed of samples to machine.

Calibration—Up to three calibration standards are present inside the main measurement area of the xray cabinet. These are basically 'golden parts', i.e. dual core, dual core with a single mantle, single core with a dual mantle. Standards have a concentricity tolerance of ±0.0005 inch.

Defect Inspection: Inner Core—enable if you want machine to measured and sort by inner core diameter. Disable. Marginal Concentricity—enable if you want the machine to sort using two levels of concentricity. For example, top level product for tour players has a tighter tolerance than regular production tolerances. If enabled, machine will sort samples into two separate fiber drums 'tour certified' and 'production' based on thresholds listed in the Thresholds section.

Images to Average (Even): this is the number of images taken by the sensor and averaged down to one image at both 0° and 90°. Settings—Set speed of SCARA robot.

Thresholds: Recipe called CS20TC_Core is currently selected; Outer Diameter Nominal target along with USL and LSL in inches; Inner Diameter—Nominal target along with USL and LSL in inches; Concentricity Fail Threshold; Concentricity Marginal Threshold; Ball Calibration Number—use calibration standard number 2 for calibrating. This is the standard that matches the samples currently running through the machine; Frequency of Calibration—machine will automatically pause measurement and recalibrate every 5000 samples. Calibration sets the number of pixels per inch. Core_Type—Select Single core or Dual core.

The operator has clicked the Select button from the Thresholds section. Double click on the recipe for the product to measure.

The operator has selected the Modify button from the Thresholds section. The menu is only accessible to an operator with elevated privileges. Enables override of settings for the current recipe. HMI to create new recipes. Congex machine vision software—This is an initial look for you of the Congex machine vision tools in use.

On the screen an Engineer can create a new recipe. Dual Core Exposure—camera brightness setting. Mantle Exposure—camera brightness setting. Need to confirm resolution of camera in machine—5MP or 2MP.

After removal from the mold, each golf ball 10 is transported to an X-ray imaging machine 20, as shown in FIG. 2. The barium or bismuth doped boundary layer 13 enhances the image of the golf ball 10 on the screen allowing for the boundary layer 13 to be distinguished from the ball 14. Thus, the inner perimeter 22 and the outer perimeter 24 of the boundary layer 13 are detected to determine the thickness of the boundary layer 13. Further, the outer perimeter 26 of the ball 14 is detected, and this measurement is subtracted from the outer perimeter 24 measurement of the boundary layer 13 to give the thickness of the ball 14. The measurements are taken at different interval points, indicated by lines 50 on the golf ball to determine if the boundary layer 13 and the ball 14 are within design parameters of concentricity about the core 12. In a preferred embodiment, eight intervals are measured, and over one hundred measurements are taken at each interval. The information is compiled by a processing system of the X-ray imaging machine 20, and the golf ball is grouped as acceptable or not. If the golf ball 10 is not within design concentricities, then the golf ball 10 is rejected and dispensed from the X-ray machine 20 through a rejection chute for recovery of the materials. If the golf ball 10 is satisfactory in terms of concentricity, then it is sent for finishing thereof.

For example, the ball 14 is measured at various points to determine if the thickness is substantially equal at each point. One preferred acceptable variation in thickness is 0.003 inches. That is, the thickness of the ball 14 does vary more than 0.003 inches at any of the points 30-33. Thus, the ball 14 is within an acceptable design parameter for concentricity if the thickness at point 30 is 0.025 inches, the thickness at point 31 is 0.024 inches, the thickness at point 32 is 0.023 and the thickness at point 33 is 0.025. Alternatively, the cover 14 is not within an acceptable design parameter for concentricity if the thickness at point 30 is 0.025 inches, the thickness at point 31 is 0.024 inches, the thickness at point 32 is 0.023 and the thickness at point 33 is 0.028. This latter example would indicate that the core 12 was not centered properly, and thus the golf ball 10 would not be balanced and would perform unacceptably for its intended purpose. Those skilled within the pertinent art will recognize that the design parameters for concentricity may be set to variations that are higher or lower than 0.003 inches without departing from the scope and spirit of the present invention.

Preferably, the outer core is composed of a polybutadiene material, zinc penta chloride, organic peroxide, zinc stearate, zinc diacrylate and zinc oxide.

In a preferred embodiment, the cover is preferably composed of a thermoplastic polyurethane material, and preferably has a thickness ranging from 0.025 inch to 0.04 inch, and more preferably ranging from 0.03 inch to 0.04 inch. The material of the cover preferably has a Shore D plaque hardness ranging from 30 to 60, and more preferably from 40 to 50. The Shore D hardness measured on the cover is preferably less than 56 Shore D. Preferably the cover 16 has a Shore A hardness of less than 96. Alternatively, the cover 16 is composed of a thermoplastic polyurethane/polyurea material. One example is disclosed in U.S. Pat. No. 7,367,903 for a Golf Ball, which is hereby incorporated by reference in its entirety. Another example is Melanson, U.S. Pat. No. 7,641,841, which is hereby incorporated by reference in its entirety. Another example is Melanson et al, U.S. Pat. No. 7,842,211, which is hereby incorporated by reference in its entirety. Another example is Matroni et al., U.S. Pat. No. 7,867,111, which is hereby incorporated by reference in its entirety. Another example is Dewanjee et al., U.S. Pat. No. 7,785,522, which is hereby incorporated by reference in its entirety.

The mantle component is preferably composed of the inner mantle layer and the outer mantle layer. The mantle component preferably has a thickness ranging from 0.05 inch to 0.15 inch, and more preferably from 0.06 inch to 0.08 inch. The outer mantle layer is preferably composed of a blend of ionomer materials. One preferred embodiment comprises SURLYN 9150 material, SURLYN 8940 material, a SURLYN AD1022 material, and a masterbatch. The SURLYN 9150 material is preferably present in an amount ranging from 20 to 45 weight percent of the cover, and more preferably 30 to 40 weight percent. The SURLYN 8945 is preferably present in an amount ranging from 15 to 35 weight percent of the cover, more preferably 20 to 30 weight percent, and most preferably 26 weight percent. The SURLYN 9945 is preferably present in an amount ranging from 30 to 50 weight percent of the cover, more preferably 35 to 45 weight percent, and most preferably 41 weight percent. The SURLYN 8940 is preferably present in an amount ranging from 5 to 15 weight percent of the cover, more preferably 7 to 12 weight percent, and most preferably 10 weight percent.

SURLYN 8320, from DuPont, is a very-low modulus ethylene/methacrylic acid copolymer with partial neutralization of the acid groups with sodium ions. SURLYN 8945, also from DuPont, is a high acid ethylene/methacrylic acid copolymer with partial neutralization of the acid groups with sodium ions. SURLYN 9945, also from DuPont, is a high acid ethylene/methacrylic acid copolymer with partial neutralization of the acid groups with zinc ions. SURLYN 8940, also from DuPont, is an ethylene/methacrylic acid copolymer with partial neutralization of the acid groups with sodium ions.

The inner mantle layer is preferably composed of a blend of ionomers, preferably comprising a terpolymer and at least two high acid (greater than 18 weight percent) ionomers neutralized with sodium, zinc, magnesium, or other metal ions. The material for the inner mantle layer preferably has a Shore D plaque hardness ranging preferably from 35 to 77, more preferably from 36 to 44, a most preferably approximately 40. The thickness of the outer mantle layer preferably ranges from 0.025 inch to 0.050 inch, and is more preferably approximately 0.037 inch. The mass of an insert including the dual core and the inner mantle layer preferably ranges from 32 grams to 40 grams, more preferably from 34 to 38 grams, and is most preferably approximately 36 grams. The inner mantle layer is alternatively composed of a HPF material available from DuPont. Alternatively, the inner mantle layer 14b is composed of a material such as disclosed in Kennedy, III et al., U.S. Pat. No. 7,361,101 for a Golf Ball And Thermoplastic Material, which is hereby incorporated by reference in its entirety.

The outer mantle layer is preferably composed of a blend of ionomers, preferably comprising at least two high acid (greater than 18 weight percent) ionomers neutralized with sodium, zinc, or other metal ions. The blend of ionomers also preferably includes a masterbatch. The material of the outer mantle layer preferably has a Shore D plaque hardness ranging preferably from 55 to 75, more preferably from 65 to 71, and most preferably approximately 67. The thickness of the outer mantle layer preferably ranges from 0.025 inch to 0.040 inch, and is more preferably approximately 0.030 inch. The mass of the entire insert including the core, the inner mantle layer and the outer mantle layer preferably ranges from 38 grams to 43 grams, more preferably from 39 to 41 grams, and is most preferably approximately 41 grams.

In an alternative embodiment, the inner mantle layer is preferably composed of a blend of ionomers, preferably comprising at least two high acid (greater than 18 weight percent) ionomers neutralized with sodium, zinc, or other metal ions. The blend of ionomers also preferably includes a masterbatch. In this embodiment, the material of the inner mantle layer has a Shore D plaque hardness ranging preferably from 55 to 75, more preferably from 65 to 71, and most preferably approximately 67. The thickness of the outer mantle layer preferably ranges from 0.025 inch to 0.040 inch, and is more preferably approximately 0.030 inch. Also in this embodiment, the outer mantle layer 14b is composed of a blend of ionomers, preferably comprising a terpolymer and at least two high acid (greater than 18 weight percent) ionomers neutralized with sodium, zinc, magnesium, or other metal ions. In this embodiment, the material for the outer mantle layer 14b preferably has a Shore D plaque hardness ranging preferably from 35 to 77, more preferably from 36 to 44, a most preferably approximately 40. The thickness of the outer mantle layer preferably ranges from 0.025 inch to 0.100 inch, and more preferably ranges from 0.070 inch to 0.090 inch.

In other golf balls, the inner mantle layer is thicker than the outer mantle layer and the outer mantle layer is harder than the inner mantle layer, the inner mantle layer is composed of a blend of ionomers, preferably comprising a terpolymer and at least two high acid (greater than 18 weight percent) ionomers neutralized with sodium, zinc, magnesium, or other metal ions. In this embodiment, the material for the inner mantle layer has a Shore D plaque hardness ranging preferably from 30 to 77, more preferably from 30 to 50, and most preferably approximately 40. In this embodiment, the material for the outer mantle layer has a Shore D plaque hardness ranging preferably from 40 to 77, more preferably from 50 to 71, and most preferably approximately 67. In this embodiment, the thickness of the inner mantle layer preferably ranges from 0.030 inch to 0.090 inch, and the thickness of the outer mantle layer ranges from 0.025 inch to 0.070 inch.

Preferably the inner core has a diameter ranging from 0.75 inch to 1.20 inches, more preferably from 0.85 inch to 1.05 inch, and most preferably approximately 0.95 inch. Preferably the inner core 12a has a Shore D hardness ranging from 20 to 50, more preferably from 25 to 40, and most preferably approximately 35. Preferably the inner core is formed from a polybutadiene, zinc diacrylate, zinc oxide, zinc stearate, a peptizer and peroxide. Preferably the inner core has a mass ranging from 5 grams to 15 grams, 7 grams to 10 grams and most preferably approximately 8 grams.

Preferably the outer core has a diameter ranging from 1.25 inch to 1.55 inches, more preferably from 1.40 inch to 1.5 inch, and most preferably approximately 1.5 inch. Preferably the inner core has a Shore D surface hardness ranging from 40 to 65, more preferably from 50 to 60, and most preferably approximately 56. Preferably the inner core is formed from a polybutadiene, zinc diacrylate, zinc oxide, zinc stearate, a peptizer and peroxide. Preferably the combined inner core and outer core have a mass ranging from 25 grams to 35 grams, 30 grams to 34 grams and most preferably approximately 32 grams.

Figure 1:
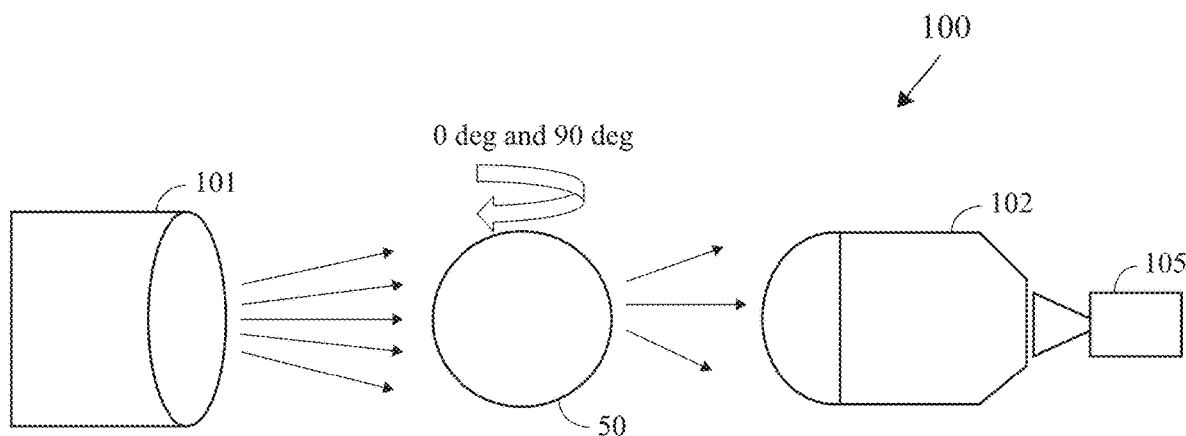
FIG. 1 is an illustration of an X-ray scanning apparatus.
Figure 1A:
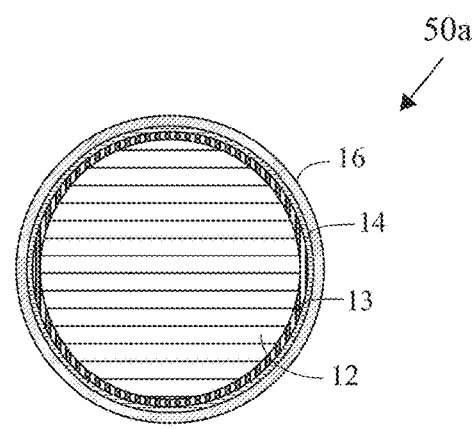
FIG. 1A is an X-ray of a golf ball.
Figure 3:
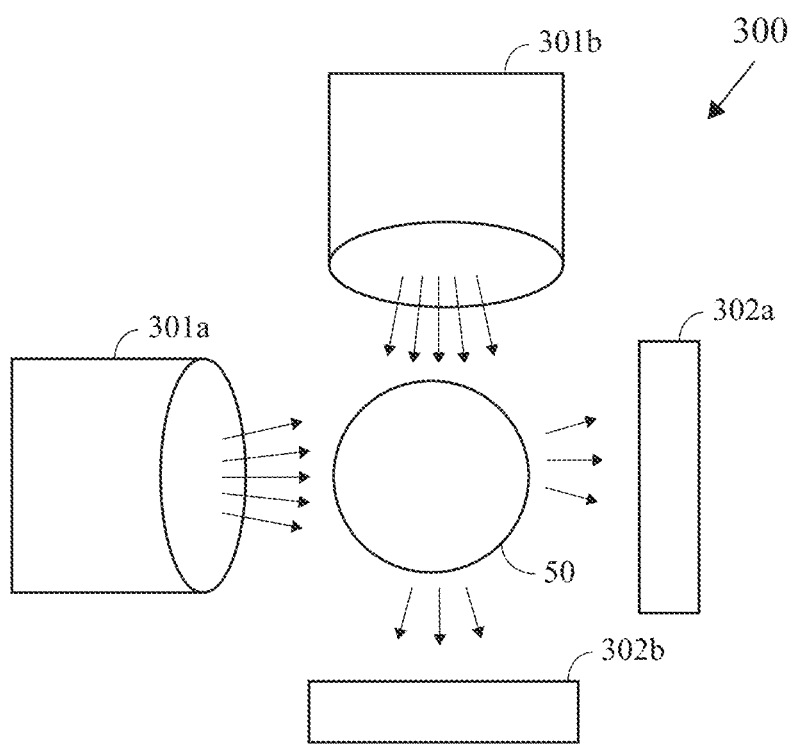
FIG. 3 is an illustration of an X-ray scanning apparatus.
Figure 4:
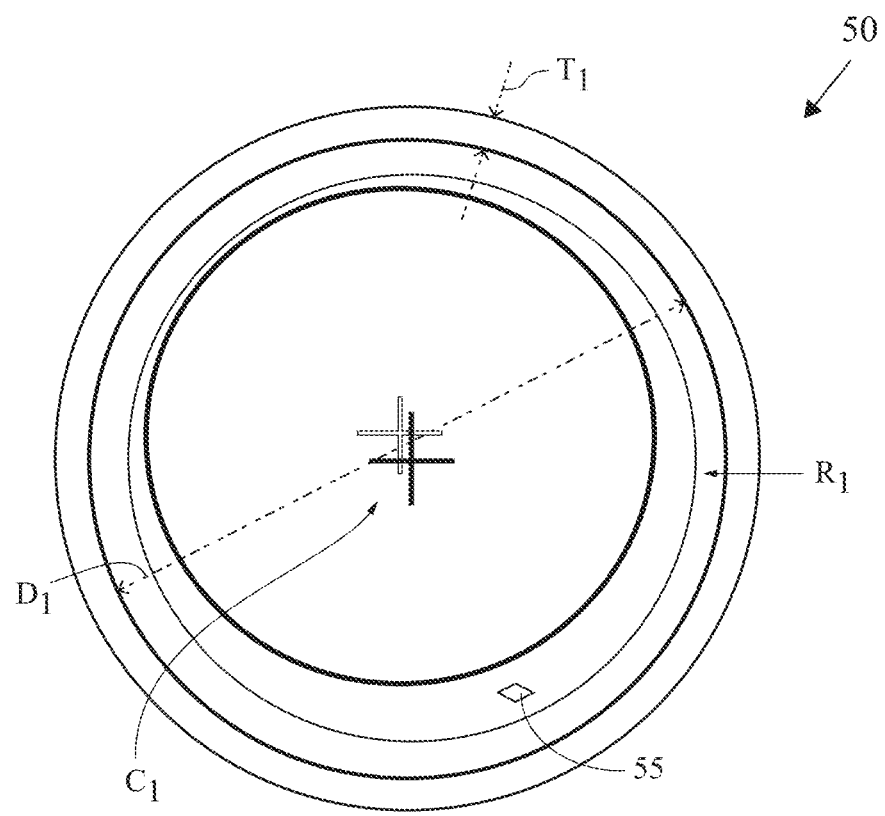
FIG. 4 is an X-ray image of a golf ball.
Figure 5A:
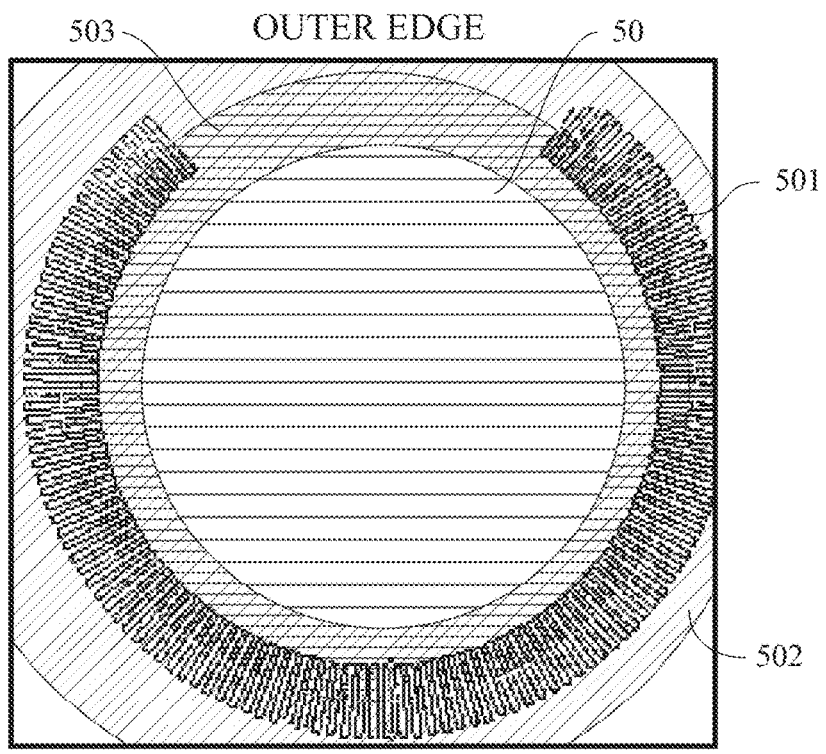
FIG. 5A is an X-ray image of a golf ball.
Figure 5B:
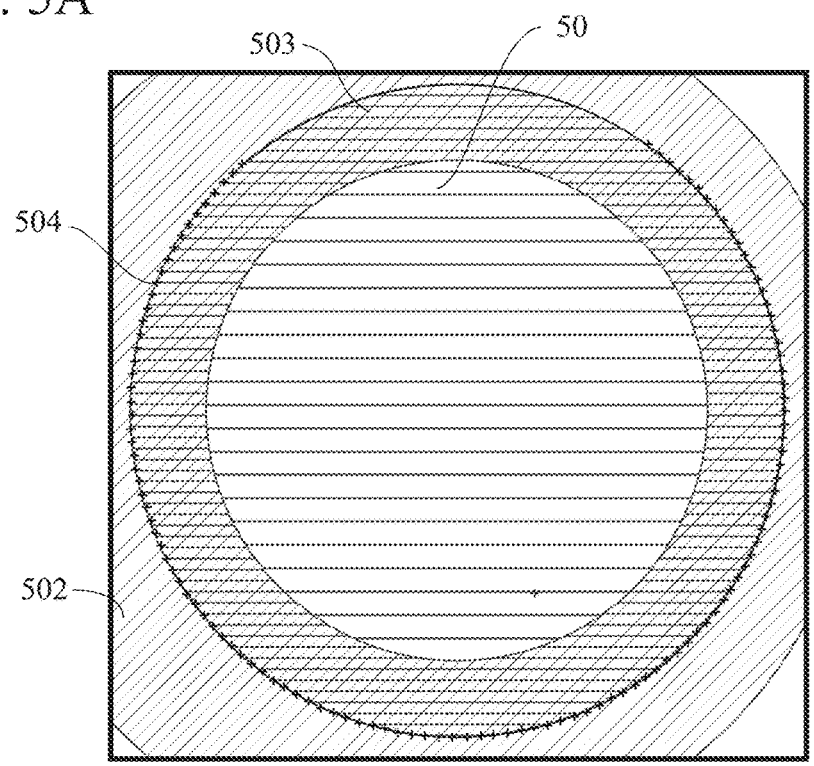
FIG. 5B is an X-ray image of a golf ball.
Figure 5C:
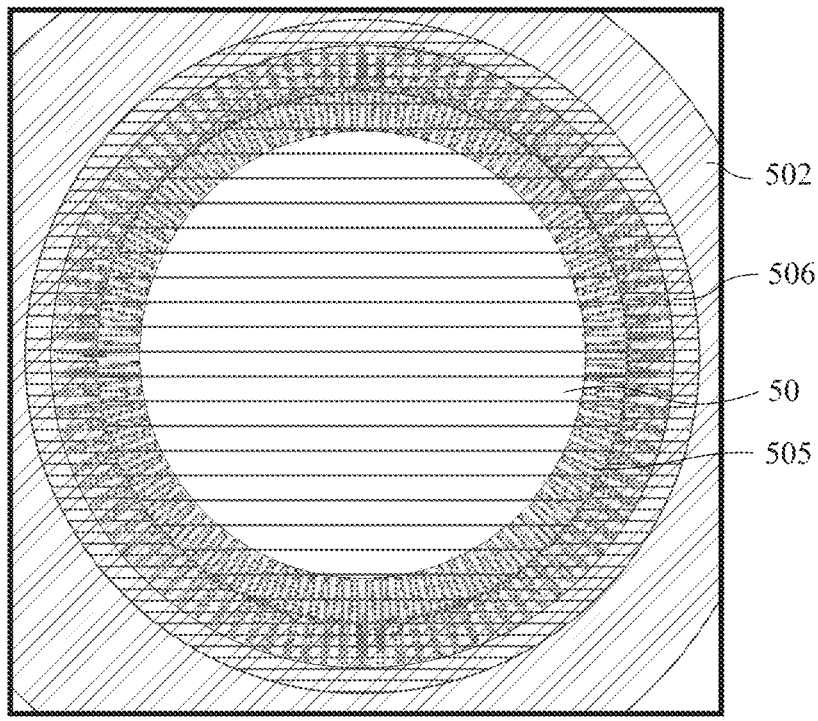
FIG. 5C is an X-ray image of a golf ball.
Figure 5D:
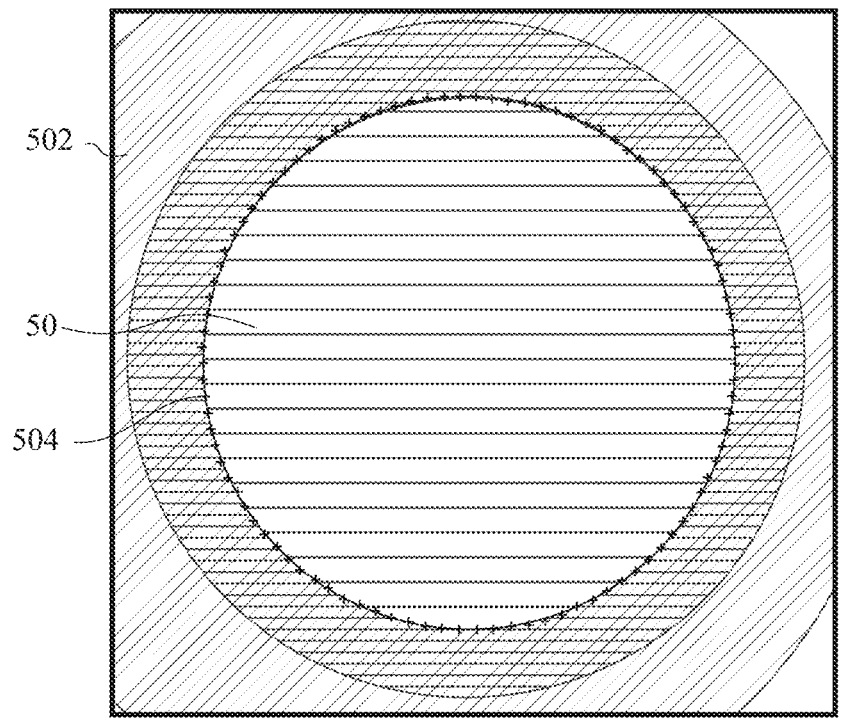
FIG. 5D is an X-ray image of a golf ball.
Figure 5E:
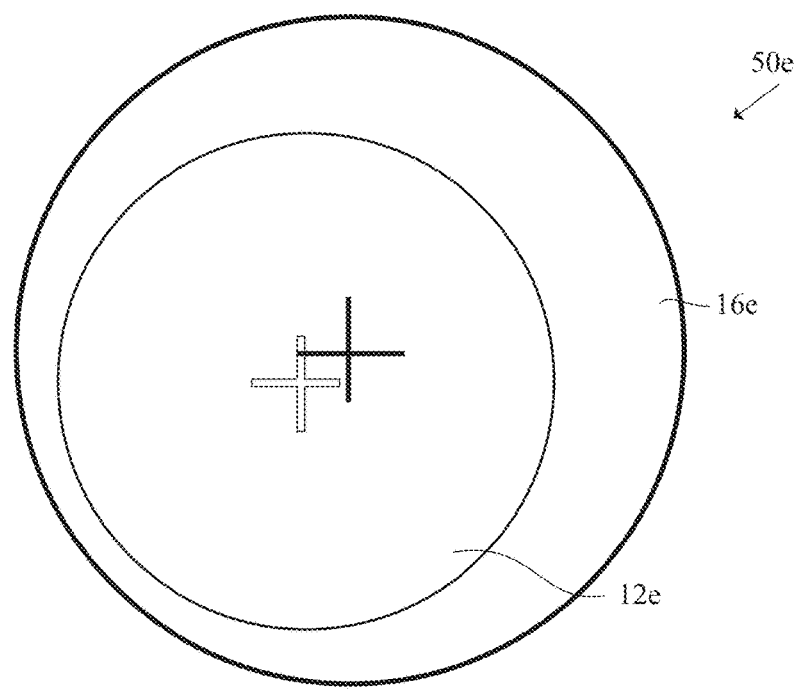
FIG. 5E is an X-ray image of a golf ball.
Figure 5F:
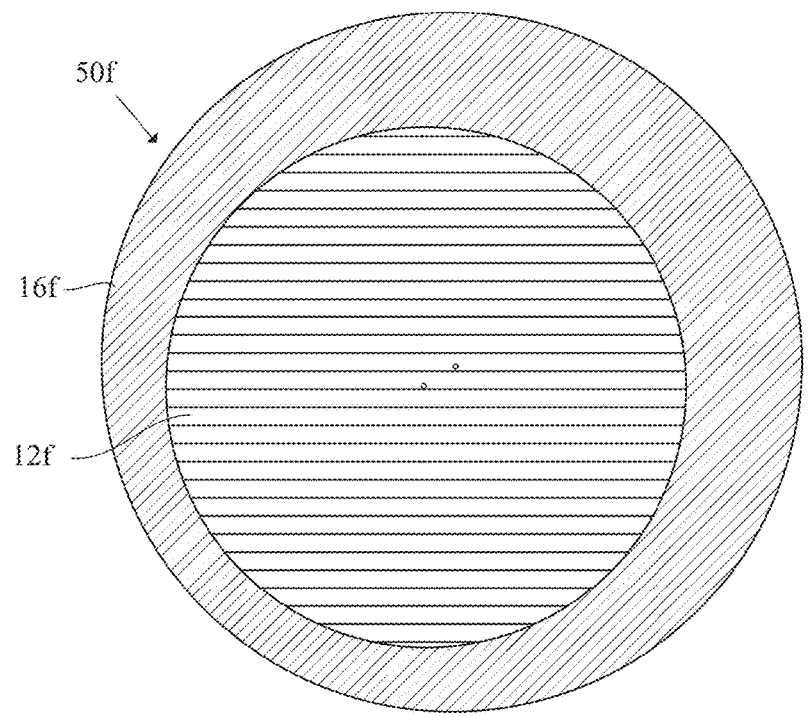
FIG. 5F is an X-ray image of a golf ball.
Figure 6A:
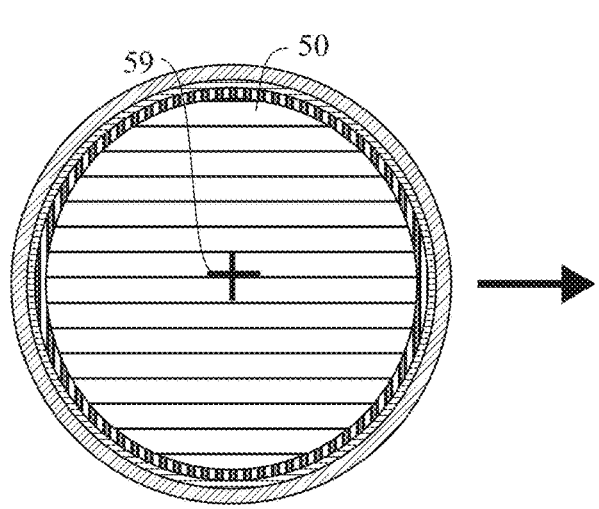
FIG. 6A is a pixel image of a golf ball.
Figure 6B:
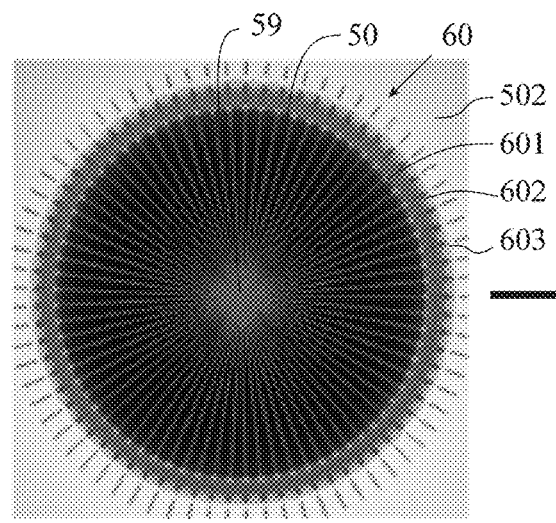
FIG. 6B is a pixel image of a golf ball.
Figure 6C:
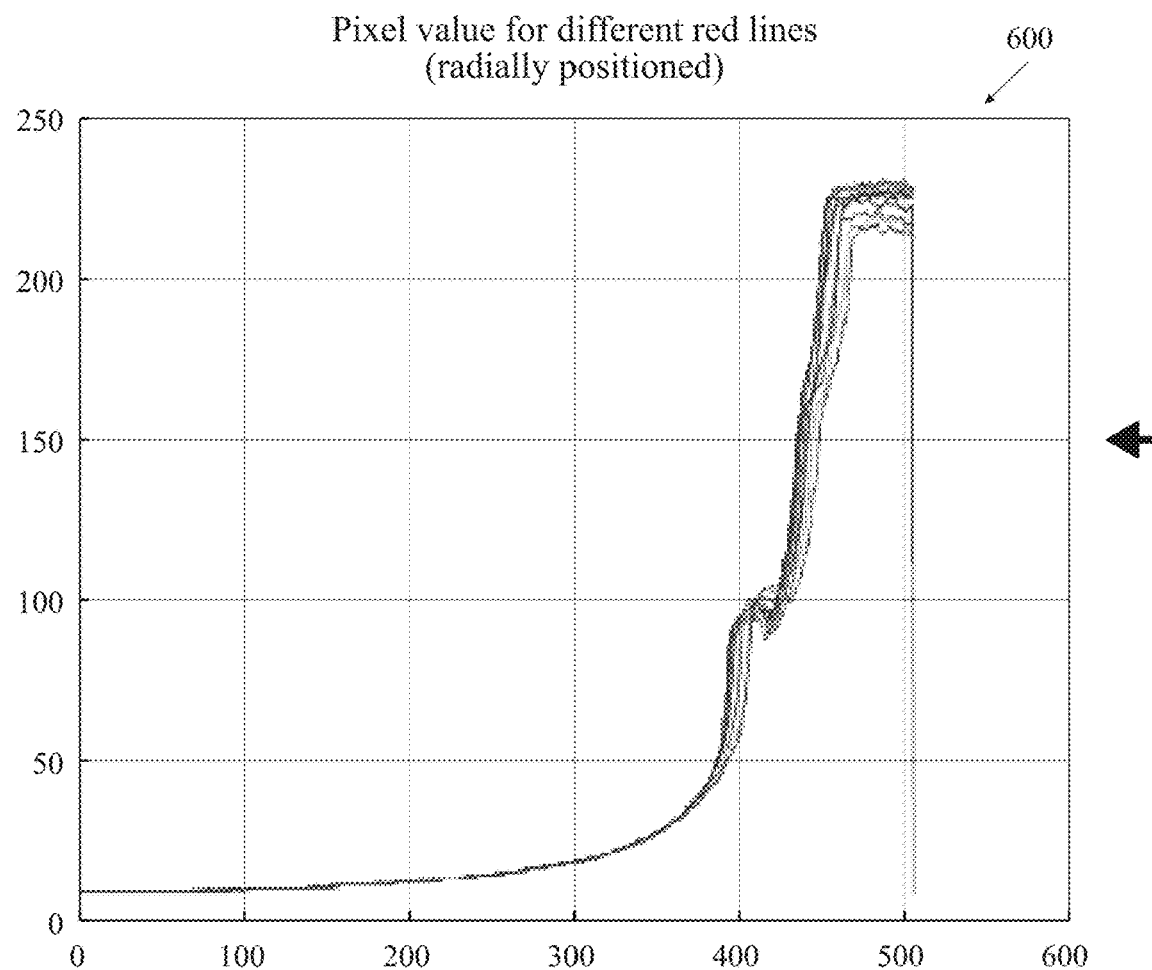
FIG. 6C is a graph of pixel values.
Figure 7A:
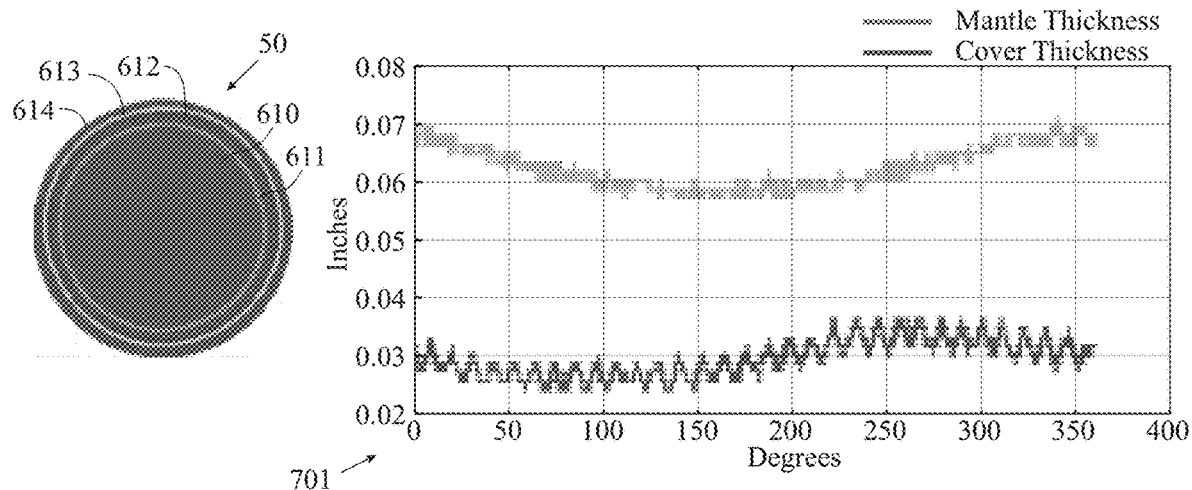
FIG. 7A is a graph of pixel values.
Figure 7B:
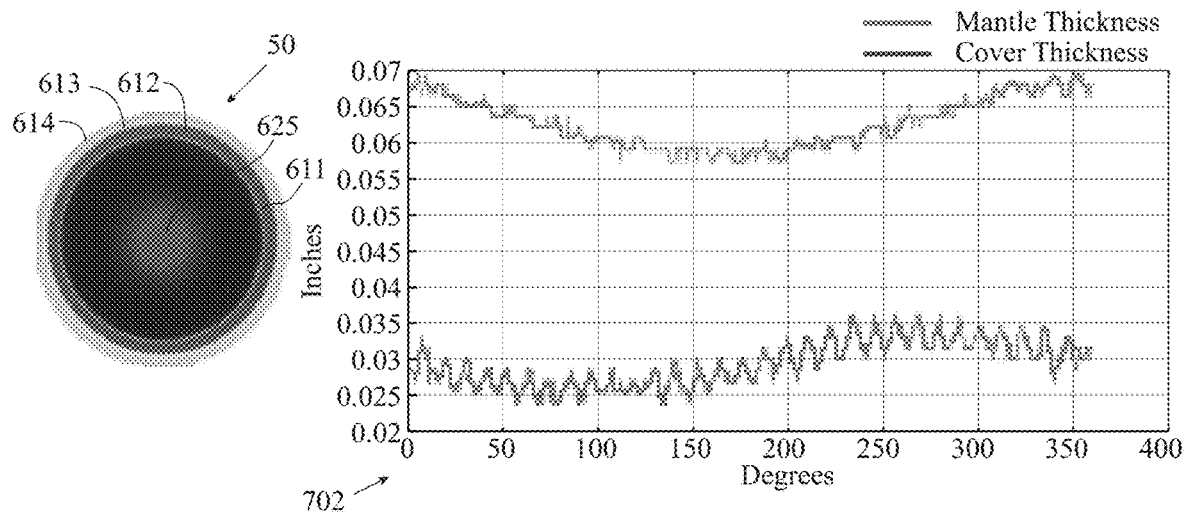
FIG. 7B is a graph of pixel values.
Figure 7C:
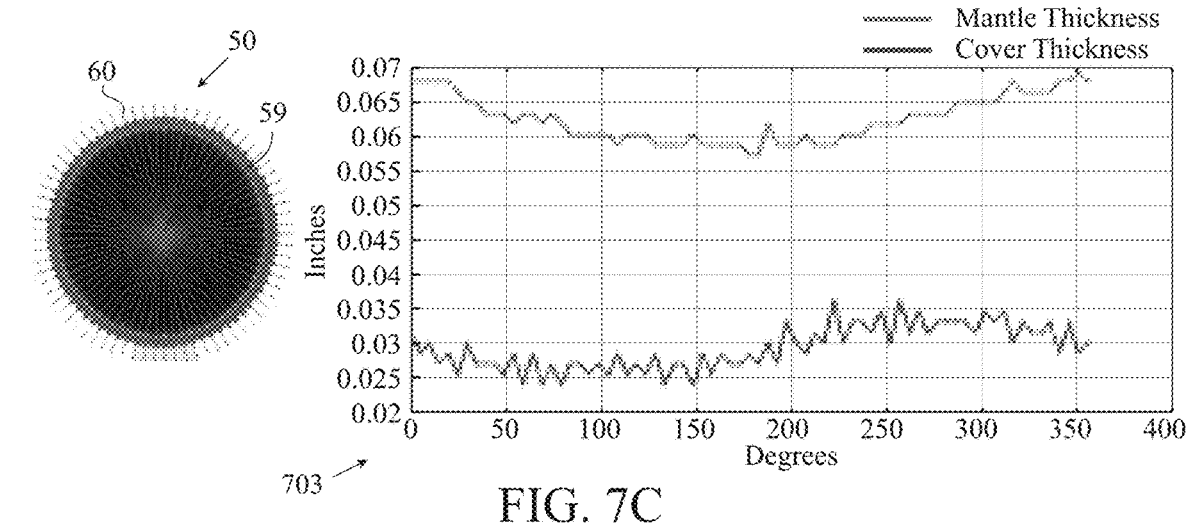
FIG. 7C is a graph of pixel values.
Figure 8:
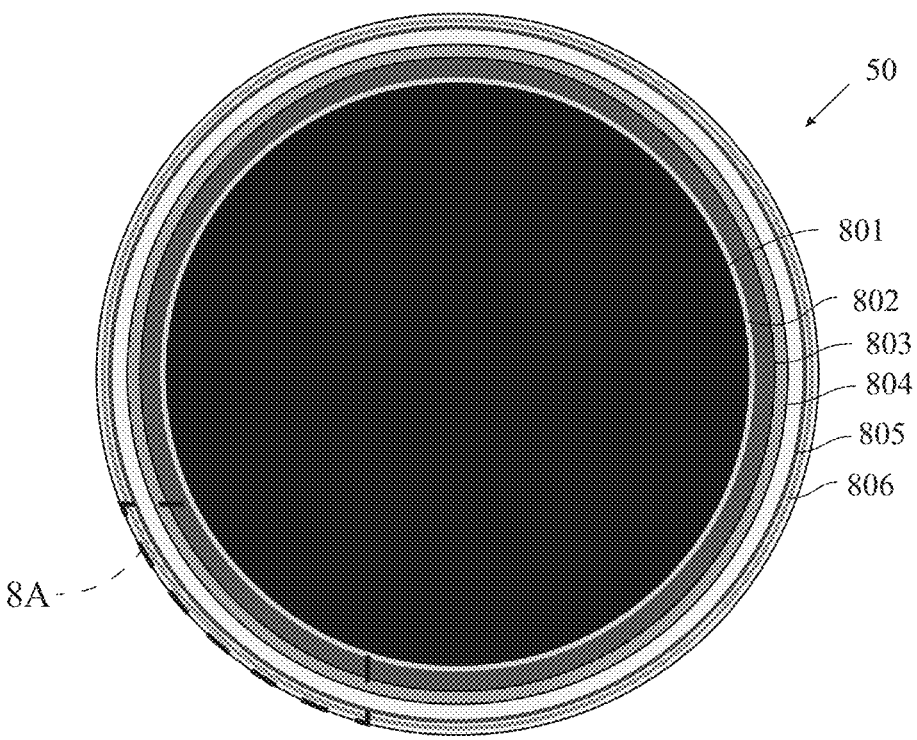
FIG. 8 is an X-ray of a golf ball.
Figure 8A:
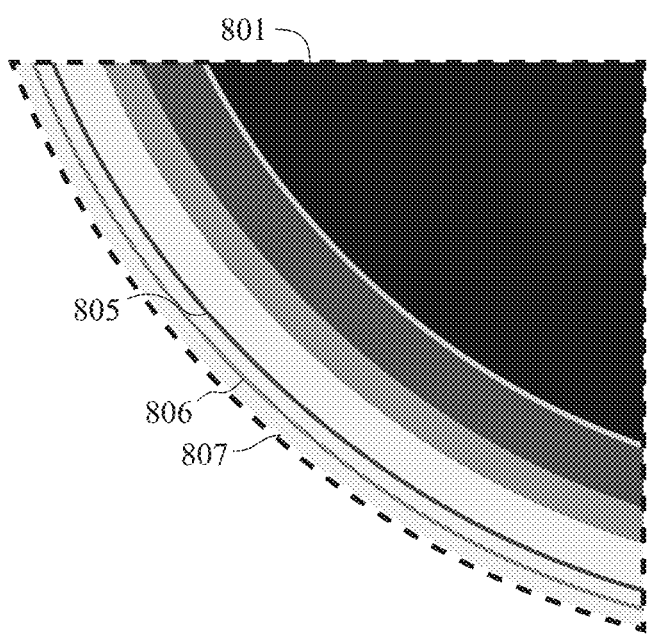
FIG. 8A is an isolated view of a portion of an X-ray of a golf ball.
Figure 9:
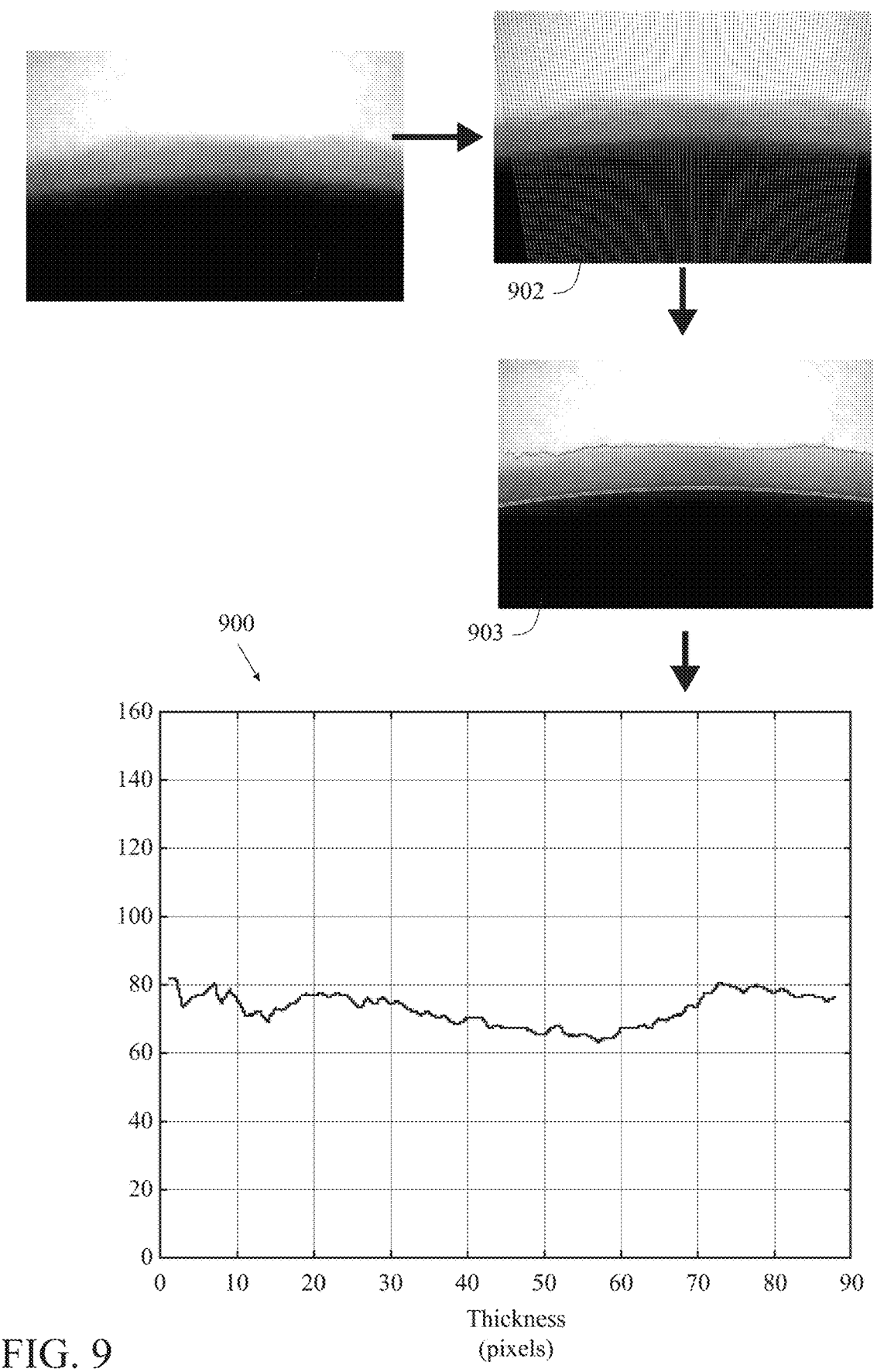
FIG. 9 is a graph of thickness based on pixels.
Figure 10:
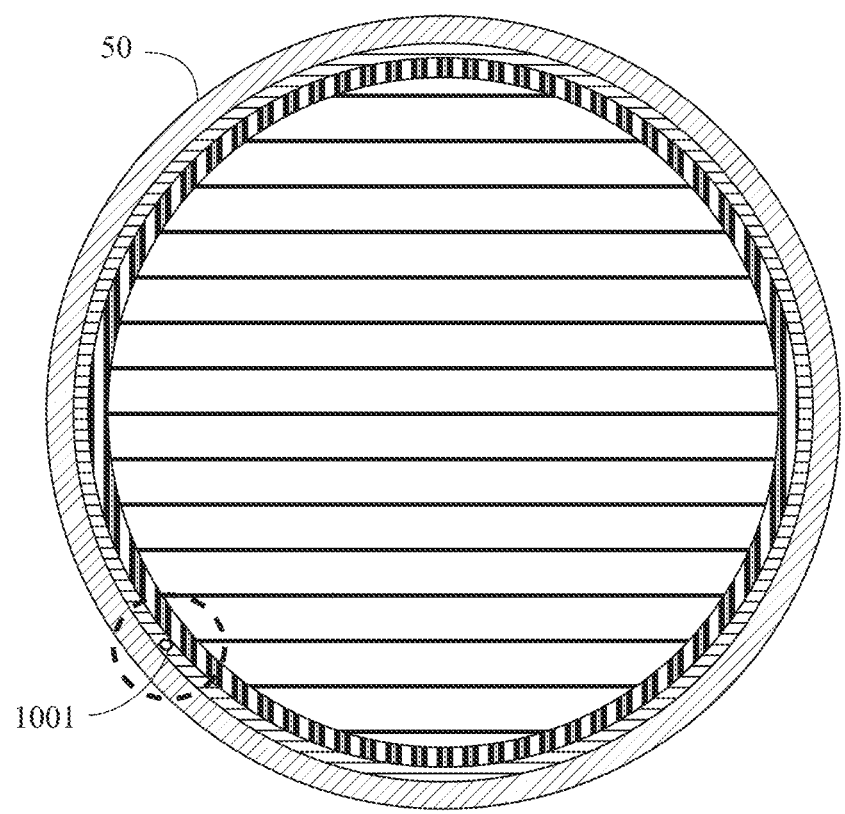
FIG. 10 is an X-ray image of a golf ball.

Preferably the inner core has a deflection of at least 0.230 inch under a load of 220 pounds, and the core has a deflection of at least 0.080 inch under a load of 200 pounds. As shown, a mass 50 is loaded onto an inner core and a core. As shown in FIGS. 6 and 7, the mass is 100 kilograms, approximately 220 pounds. Under a load of 100 kilograms, the inner core preferably has a deflection from 0.230 inch to 0.300 inch. Under a load of 100 kilograms, preferably the core has a deflection of 0.08 inch to 0.150 inch. Alternatively, the load is 200 pounds (approximately 90 kilograms), and the deflection of the core 12 is at least 0.080 inch. Further, a compressive deformation from a beginning load of 10 kilograms to an ending load of 130 kilograms for the inner core ranges from 4 millimeters to 7 millimeters and more preferably from 5 millimeters to 6.5 millimeters. The dual core deflection differential allows for low spin off the tee to provide greater distance, and high spin on approach shots.

In an alternative embodiment of the golf ball, the golf ball 10 comprises an inner core 12a, an intermediate core 12b, an outer core 12b, a mantle 14 and a cover 16. The golf ball 10 preferably has a diameter of at least 1.68 inches, a mass ranging from 45 grams to 47 grams, a COR of at least 0.79, a deformation under a 100 kilogram loading of at least 0.07 mm.

In one embodiment, the golf ball comprises a core, a mantle layer and a cover layer. The core comprises an inner core sphere, an intermediate core layer and an outer core layer. The inner core sphere comprises a polybutadiene material and has a diameter ranging from 0.875 inch to 1.4 inches. The intermediate core layer is composed of a highly neutralized ionomer and has a Shore D hardness less than 40. The outer core layer is composed of a highly neutralized ionomer and has a Shore D hardness less than 45. A thickness of the intermediate core layer is greater than a thickness of the outer core layer. The mantle layer is disposed over the core, comprises an ionomer material and has a Shore D hardness greater than 55. The cover layer is disposed over the mantle layer comprises a thermoplastic polyurethane material and has a Shore A hardness less than 100. The golf ball has a diameter of at least 1.68 inches. The mantle layer is harder than the outer core layer, the outer core layer is harder than the intermediate core layer, the intermediate core layer is harder than the inner core sphere, and the cover layer is softer than the mantle layer.

In another golf ball, the golf ball 10 has a multi-layer core and multi-layer mantle. The golf ball includes a core, a mantle component and a cover layer. The core comprises an inner core sphere, an intermediate core layer and an outer core layer. The inner core sphere comprises a polybutadiene material and has a diameter ranging from 0.875 inch to 1.4 inches. The intermediate core layer is composed of a highly neutralized ionomer and has a Shore D hardness less than 40. The outer core layer is composed of a highly neutralized ionomer and has a Shore D hardness less than 45. A thickness of the intermediate core layer is greater than a thickness of the outer core layer 12c. The inner mantle layer is disposed over the core, comprises an ionomer material and has a Shore D hardness greater than 55. The outer mantle layer is disposed over the inner mantle layer, comprises an ionomer material and has a Shore D hardness greater than 60. The cover layer is disposed over the mantle component, comprises a thermoplastic polyurethane material and has a Shore A hardness less than 100. The golf ball has a diameter of at least 1.68 inches. The outer mantle layer is harder than the inner mantle layer, the inner mantle layer is harder than the outer core layer, the outer core layer is harder than the intermediate core layer, the intermediate core layer is harder than the inner core sphere, and the cover layer is softer than the outer mantle layer.

In a particularly preferred embodiment of the invention, the golf ball preferably has an aerodynamic pattern such as disclosed in Simonds et al., U.S. Pat. No. 7,419,443 for a Low Volume Cover For A Golf Ball, which is hereby incorporated by reference in its entirety. Alternatively, the golf ball has an aerodynamic pattern such as disclosed in Simonds et al., U.S. Pat. No. 7,338,392 for An Aerodynamic Surface Geometry For A Golf Ball, which is hereby incorporated by reference in its entirety.

Various aspects of the present invention golf balls have been described in terms of certain tests or measuring procedures. These are described in greater detail as follows.

As used herein, "Shore D hardness" of the golf ball layers is measured generally in accordance with ASTM D-2240 type D, except the measurements may be made on the curved surface of a component of the golf ball, rather than on a plaque. If measured on the ball, the measurement will indicate that the measurement was made on the ball. In referring to a hardness of a material of a layer of the golf ball, the measurement will be made on a plaque in accordance with ASTM D-2240. Furthermore, the Shore D hardness of the cover is measured while the cover remains over the mantles and cores. When a hardness measurement is made on the golf ball, the Shore D hardness is preferably measured at a land area of the cover.

As used herein, "Shore A hardness" of a cover is measured generally in accordance with ASTM D-2240 type A, except the measurements may be made on the curved surface of a component of the golf ball, rather than on a plaque. If measured on the ball, the measurement will indicate that the measurement was made on the ball. In referring to a hardness of a material of a layer of the golf ball, the measurement will be made on a plaque in accordance with ASTM D-2240. Furthermore, the Shore A hardness of the cover is measured while the cover remains over the mantles and cores. When a hardness measurement is made on the golf ball, Shore A hardness is preferably measured at a land area of the cover The resilience or coefficient of restitution (COR) of a golf ball is the constant "e," which is the ratio of the relative velocity of an elastic sphere after direct impact to that before impact. As a result, the COR ("e") can vary from 0 to 1, with 1 being equivalent to a perfectly or completely elastic collision and 0 being equivalent to a perfectly or completely inelastic collision.

COR, along with additional factors such as club head speed, club head mass, ball weight, ball size and density, spin rate, angle of trajectory and surface configuration as well as environmental conditions (e.g. temperature, moisture, atmospheric pressure, wind, etc.) generally determine the distance a ball will travel when hit. Along this line, the distance a golf ball will travel under controlled environmental conditions is a function of the speed and mass of the club and size, density and resilience (COR) of the ball and other factors. The initial velocity of the club, the mass of the club and the angle of the ball's departure are essentially provided by the golfer upon striking. Since club head speed, club head mass, the angle of trajectory and environmental conditions are not determinants controllable by golf ball producers and the ball size and weight are set by the U.S.G.A., these are not factors of concern among golf ball manufacturers. The factors or determinants of interest with respect to improved distance are generally the COR and the surface configuration of the ball.

The coefficient of restitution is the ratio of the outgoing velocity to the incoming velocity. In the examples of this application, the coefficient of restitution of a golf ball was measured by propelling a ball horizontally at a speed of 125+/−5 feet per second (fps) and corrected to 125 fps against a generally vertical, hard, flat steel plate and measuring the ball's incoming and outgoing velocity electronically. Speeds were measured with a pair of ballistic screens, which provide a timing pulse when an object passes through them. The screens were separated by 36 inches and are located 25.25 inches and 61.25 inches from the rebound wall. The ball speed was measured by timing the pulses from screen 1 to screen 2 on the way into the rebound wall (as the average speed of the ball over 36 inches), and then the exit speed was timed from screen 2 to screen 1 over the same distance. The rebound wall was tilted 2 degrees from a vertical plane to allow the ball to rebound slightly downward in order to miss the edge of the cannon that fired it. The rebound wall is solid steel.

As indicated above, the incoming speed should be 125±5 fps but corrected to 125 fps. The correlation between COR and forward or incoming speed has been studied and a correction has been made over the ±5 fps range so that the COR is reported as if the ball had an incoming speed of exactly 125.0 fps.

The measurements for deflection, compression, hardness, and the like are preferably performed on a finished golf ball as opposed to performing the measurement on each layer during manufacturing.

Preferably, in a five layer golf ball comprising an inner core, an outer core, an inner mantle layer, an outer mantle layer and a cover, the hardness/compression of layers involve an inner core with the greatest deflection (lowest hardness), an outer core (combined with the inner core) with a deflection less than the inner core, an inner mantle layer with a hardness less than the hardness of the combined outer core and inner core, an outer mantle layer with the hardness layer of the golf ball, and a cover with a hardness less than the hardness of the outer mantle layer. These measurements are preferably made on a finished golf ball that has been torn down for the measurements.

Preferably the inner mantle layer is thicker than the outer mantle layer or the cover layer. The dual core and dual mantle golf ball creates an optimized velocity-initial velocity ratio (Vi/IV), and allows for spin manipulation. The dual core provides for increased core compression differential resulting in a high spin for short game shots and a low spin for driver shots. A discussion of the USGA initial velocity test is disclosed in Yagley et al., U.S. Pat. No. 6,595,872 for a Golf Ball With High Coefficient Of Restitution, which is hereby incorporated by reference in its entirety. Another example is Bartels et al., U.S. Pat. No. 6,648,775 for a Golf Ball With High Coefficient Of Restitution, which is hereby incorporated by reference in its entirety.

Crast et al., U.S. Pat. No. 6,632,877, for a Dual Curable Coating, is hereby incorporated by reference in its entirety.

Skrabski et al., U.S. Pat. No. 6,544,337, for a Golf ball Painting System, is hereby incorporated by reference in its entirety.

Crast et al., U.S. Pat. No. 6,365,679, for a Two component polyurethane clear coat for golf balls, is hereby incorporated by reference in its entirety.

Crast et al., U.S. Pat. No. 6,165,564, for a UV Clearable Clear Coat For Golf Balls, is hereby incorporated by reference in its entirety.

Skrabski et al., U.S. Pat. No. 6,319,563, for a Golf ball Painting Method, is hereby incorporated by reference in its entirety.

Bartels, U.S. Pat. No. 9,278,260, for a Low Compression Three-Piece Golf Ball With An Aerodynamic Drag Rise At High Speeds, is hereby incorporated by reference in its entirety.

Chavan et al, U.S. Pat. No. 9,789,366, for a Graphene Core For A Golf Ball, is hereby incorporated by reference in its entirety.

Chavan et al, U.S. patent application Ser. No. 15/705,011, filed on Sep. 14, 2017, for a Graphene Core For A Golf Ball, is hereby incorporated by reference in its entirety.

Chavan et al, U.S. patent application Ser. No. 15/729,231, filed on Oct. 10, 2017, for a Graphene And Nanotube Reinforced Golf Ball, is hereby incorporated by reference in its entirety.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention the following:

1. A golf ball comprising:
   a center core layer;
   a mantle layer disposed over the core; and
   a cover layer disposed over the mantle layer;
   wherein at least one layer of the center core, mantle layer and cover layer has a pixel value gradient of 0.75 or less from an inner edge to an outer edge of the at least one layer when examined with a radiographic imaging system.

2. The golf ball according to claim 1 wherein at least one layer comprises from 1.0% to 25% by weight of a radio-opaque filler.

3. The golf ball according to claim 2 wherein the radio-opaque filler is a compound based on barium, bismuth, tungsten, iodine, or reduced iron.

4. The golf ball according to claim 1 wherein the cover layer is comprises a polyurethane material or an ionomer material.

5. The golf ball according to claim 1 wherein the center core comprises a polybutadiene material.

6. The golf ball according to claim 1 further comprising:
   an outer core disposed over the center core;
   an outer mantle layer disposed over the mantle layer, the outer mantle layer having a thickness ranging from 0.025 inch to 0.060 inch;
   and
   wherein the cover layer is disposed over the outer mantle layer, the cover layer has a thickness ranging from 0.025 inch to 0.040 inch.

7. The golf ball according to claim 1 further comprising:
   an outer core disposed over the center core;
   wherein the outer core comprises from 0.05% to 70% by weight of a radio-opaque filler.

8. The golf ball according to claim 1 further comprising:
   an outer mantle layer disposed over the mantle layer,
   wherein the outer mantle layer comprises from 0.05% to 70% by weight of a radio-opaque filler.

9. The golf ball according to claim 2 further comprising:
   a first center mantle layer disposed over the mantle layer, the first center mantle layer having a thickness ranging from 0.020 inch to 0.060 inch, the first center mantle layer material having a plaque Shore D hardness ranging from 40 to 65, the first center mantle layer composed of a fully neutralized polymer material;
   a second center mantle layer disposed over the first center mantle layer, the second center mantle layer having a thickness ranging from 0.020 inch to 0.060 inch, the second center mantle layer material having a plaque Shore D hardness ranging from 40 to 65, the second center mantle layer composed of a fully neutralized polymer material;
   an outer mantle layer disposed over the second center mantle layer, the outer mantle layer having a thickness ranging from 0.020 inch to 0.060 inch, the outer mantle layer composed of an ionomer material, the outer mantle layer material having a plaque Shore D hardness ranging from 60 to 75; and wherein the cover layer is disposed over the outer mantle layer, the cover layer having a thickness ranging from 0.025 inch to 0.040 inch.

10. A golf ball comprising:
a center core layer;
a mantle layer disposed over the core; and
a cover layer disposed over the mantle layer,
wherein at least one layer comprises from 1.0% to 25% by weight of a radio-opaque filler, and wherein at least one layer of the center core, mantle layer and cover layer has a pixel value at its outer edge that is a factor of 0.88 or smaller than the maximum pixel value recorded within the layer using a radiographic imaging system.

11. The golf ball according to claim 10 wherein the radio-opaque filler is a compound based on barium, bismuth, tungsten, iodine, or reduced iron.

12. The golf ball according to claim 10 further comprising:
an outer core disposed over the center core;
wherein the outer core comprises from 0.05% to 70% by weight of a radio-opaque filler.

13. The golf ball according to claim 10 further comprising:
an outer mantle layer disposed over the mantle layer,
wherein the outer mantle layer comprises from 0.05% to 70% by weight of a radio-opaque filler.

14. A golf ball comprising:
a center core layer;
a mantle layer disposed over the core; and
a cover layer disposed over the mantle layer;
wherein at least layer comprises from 1.0% to 25% by weight of a radio-opaque filler, and wherein at an inner layer, a linear attenuation coefficient (Mu) increases by a minimum factor of 1.20 from an inner layer edge to an outer layer edge.

15. The golf ball according to claim 14 wherein the radio-opaque filler is a compound based on barium, bismuth, tungsten, iodine, or reduced iron.

16. The golf ball according to claim 14 further comprising:
an outer core disposed over the center core;
wherein the outer core comprises from 0.05% to 70% by weight of a radio-opaque filler.

17. The golf ball according to claim 14 further comprising:
an outer mantle layer disposed over the mantle layer;
wherein the outer mantle layer comprises from 0.05% to 70% by weight of a radio-opaque filler.

18. The golf ball according to claim 14 wherein at an outer layer, a linear attenuation coefficient (Mu) decreases by a factor of 1.11 or more from an inner layer edge to an outer layer edge.

* * * * *